(12) United States Patent
Talon et al.

(10) Patent No.: US 12,433,443 B2
(45) Date of Patent: Oct. 7, 2025

(54) FLUID-PROCESSING DEVICE FOR A BEVERAGE PREPARATION MACHINE

(71) Applicant: SOCIETE DES PRODUITS NESTLE S.A., Vevey (CH)

(72) Inventors: Christian Talon, Vufflens-le-Chateau (CH); Christophe Sebastien Paul Heydel, Chez-le-Bart (CH)

(73) Assignee: Société des Produits Nestlé S.A., Vevey (CH)

( * ) Notice: Subject to any disclaimer, the term of this patent is extended or adjusted under 35 U.S.C. 154(b) by 770 days.

(21) Appl. No.: 17/756,767

(22) PCT Filed: Dec. 1, 2020

(86) PCT No.: PCT/EP2020/084064
§ 371 (c)(1),
(2) Date: Jun. 2, 2022

(87) PCT Pub. No.: WO2021/110650
PCT Pub. Date: Jun. 10, 2021

(65) Prior Publication Data
US 2022/0408962 A1    Dec. 29, 2022

(30) Foreign Application Priority Data
Dec. 4, 2019 (EP) ..................................... 19213413

(51) Int. Cl.
*A47J 31/40* (2006.01)
*A47J 31/36* (2006.01)
(52) U.S. Cl.
CPC ......... *A47J 31/407* (2013.01); *A47J 31/3628* (2013.01); *A47J 31/3695* (2013.01)
(58) Field of Classification Search
CPC .. A47J 31/407; A47J 31/3676; A47J 31/3628; A47J 31/3695; B65D 85/804;
(Continued)

(56) References Cited

U.S. PATENT DOCUMENTS

2010/0116142 A1    5/2010  Versini
2018/0155091 A1*   6/2018  Cafaro .................. B65D 85/80

FOREIGN PATENT DOCUMENTS

CN    102389261 A    3/2012
CN    109662580 A    4/2019
(Continued)

OTHER PUBLICATIONS

Chinese Office Action for Appl No. 202080084451.1 dated Sep. 28, 2023.
(Continued)

*Primary Examiner* — Reginald Alexander
(74) *Attorney, Agent, or Firm* — Thorpe North & Western, LLP

(57) ABSTRACT

A fluid processing device (10) for a beverage preparation machine is described. The fluid processing device (10) is configured for processing a fluid substance to be introduced into a container (C) for the preparation of a beverage product by mixing of the fluid substance with an ingredient contained in the container (C). The fluid processing device (10) comprises a fluid processing body (12) provided with an inlet portion (14). The fluid processing body (12) comprises in turn at least one inlet means (18) for introducing the fluid substance into the container (C). The inlet means (18) is provided at the inlet portion (14) of the fluid processing body (12). The fluid processing body (12) also comprises an outlet portion (16) and at least one outlet means (20) for dispensing the beverage product from the container (C). The outlet means (20) is provided at the outlet portion (16) of the fluid processing body (12). Preferably, the fluid processing body (12) is a needle-shaped fluid processing body (12) comprising at least one end portion (26; 28) configured for perforating, piercing and/or tearing a specific portion or wall of
(Continued)

the container (C) before the introduction of the fluid substance into the container (C).

16 Claims, 17 Drawing Sheets

(58) Field of Classification Search
CPC ............ B65D 85/8043; B65D 85/8049; B65D 85/8052
See application file for complete search history.

(56) References Cited

FOREIGN PATENT DOCUMENTS

| | | | | |
|---|---|---|---|---|
| DE | 2424477 | A1 | 12/1975 | |
| EP | 2374733 | | 10/2011 | |
| GB | 1256247 | A | 12/1971 | |
| JP | H08207997 | A | 8/1996 | |
| JP | 2007503231 | A | 2/2007 | |
| RU | 2544812 | C2 | 3/2015 | |
| WO | WO-2015049270 | A1 * | 4/2015 | ......... B65D 85/8043 |
| WO | 2017121796 | | 7/2017 | |
| WO | 2018007383 | | 1/2018 | |

OTHER PUBLICATIONS

Chinese Office Action for Appl No. 20208008445.1 dated Sep. 7, 2024, 9 pages.
Japanese Office Action for Appl No. 2022-533446 dated Sep. 3, 2024, 6 pages.
Russian Office Action for Russian Appl No. 2022117207/03 dated Mar. 28, 2024.

* cited by examiner

FLUID-PROCESSING DEVICE FOR A BEVERAGE PREPARATION MACHINE

CROSS REFERENCE TO RELATED APPLICATIONS

The present application is a National Stage of International Application No. PCT/EP2020/084064, filed on Dec. 1, 2020, which claims priority to European Patent Application No. 19213413.8, filed on Dec. 4, 2019, the entire contents of which are being incorporated herein by reference.

FIELD OF THE INVENTION

The present invention concerns a fluid processing device for a beverage preparation machine, particularly a machine for preparing a beverage product by mixing a fluid substance with an ingredient contained in a container, such as e.g. a sachet.

BACKGROUND OF THE INVENTION

All known systems for in-home preparation of beverages involve a machine that receives an ingredient storage container for storing an ingredient for the preparation of a beverage product. Generally, the ingredient container is introduced in the beverage preparation machine, and the machine passes a fluid (typically hot water) through a dose of the ingredient. The beverage product prepared by mixing the soluble ingredient and the fluid substance is then dispensed out of the container to a consumer receptacle (typically a cup).

Typically, the fluid passed from the beverage preparation machine to the container is introduced either by a shower plate that is in contact with a fluid permeable side of the container. Alternatively, the beverage preparation machine comprises a fluid processing device that pierces through an inlet wall of the container and injects the fluid therein (generally under a certain pressure). In such beverage preparation machines known in the art, dispensing of the beverage product from the container is performed either by:
a) building a fluid pressure inside the closed cavity of the container until a dispensing wall of the container self opens and lets the beverage product out, or
b) by piercing a dispensing wall of the container by a dispensing needle means (or other similar piercing means) of the beverage preparation machine, that is able to withdraw or let the beverage product out of the container vicinity.

In cases where the dispensing side of the container self opens, this can lead to variations in the pressure or manner of opening from one container to another, and to some undesirable variations in quality of the dispensed beverage product.

In cases where the beverage preparation machine comprises a dispensing needle means for piercing a dispensing wall of the container, the technology of adding this dispensing needle means in addition to the fluid processing device used for injecting the mixing fluid into the container, adds complexity and cost to the beverage preparation machine.

There is therefore a need for a fluid processing device for a beverage preparation machine, which obviates the above-cited drawbacks of existing beverage systems, and in particular is simpler and offers more reproducible quality from one beverage product to another, overtime.

SUMMARY OF THE INVENTION

The invention as claimed in claim 1 is a fluid processing device for a beverage preparation machine. The fluid processing device is configured for processing a fluid substance to be introduced into an ingredient storage container of the beverage preparation machine for the preparation of a beverage product by mixing of the fluid substance with an ingredient contained in the container. The fluid processing device comprises a fluid processing body provided with an inlet portion and an outlet portion. The fluid processing body comprises in turn at least one inlet means for introducing the fluid substance into the container. The inlet means is provided at the inlet portion of the fluid processing body. The fluid processing body also comprises at least one outlet means for dispensing the beverage product from the container. The outlet means is provided at the outlet portion of the fluid processing body. The fluid processing device for a beverage preparation machine according to the invention is thus capable both of introducing a fluid substance into the ingredient storage container, and also of dispensing the beverage product formed inside the machine.

Advantageously, the fluid processing body is a needle-shaped fluid processing body, comprising at least one end portion configured for perforating, and/or piercing, and/or tearing a specific portion or wall of the container before the introduction of the fluid substance into the container.

Advantageously, the fluid processing body further comprises at least one sealing means to be engaged with the container for preventing leakage of the fluid substance and/or the beverage product from the container at least when the fluid substance is introduced into the container.

In a preferred embodiment of the invention, the fluid processing body further comprises:
a first end portion which is provided at the inlet portion of the fluid processing body and which is configured for opening a portion or wall of the container;
a second end portion which is provided at the outlet portion of the fluid processing body; and
at least one first inlet conduit arranged within the fluid processing body and in fluid communication with the first end portion and with an inlet port of the fluid processing device.

In this preferred embodiment of the invention, the inlet means and the outlet means are separate one to another, the inlet means comprises the first inlet conduit and the first end portion of the fluid processing body, whereas the outlet means comprises the second end portion of the fluid processing body.

Preferably, the fluid processing body is an elongated body, more preferably a vertically oriented elongated body, with its first end portion, its second end portion and its sealing means coaxially arranged about a longitudinal axis, more preferably a vertical axis, wherein the first end portion and/or the second end portion are point shaped portions respectively.

Preferably, the outlet means comprise at least one outlet conduit which is distinct from the first inlet conduit. More preferably, the outlet conduit:
is a grooved channel provided on the outer surface of the fluid processing body; and
is in fluid communication with the second end portion of the fluid processing body.

According to a possible embodiment, the fluid processing body comprises, between its first end portion and its second end portion, an enlarged portion having a cross-sectional area which is larger than any cross-sectional areas of the portion of the fluid processing body comprised between its first end portion and its enlarged portion. This enlarged portion is configured for adhering against a wall of the container at a portion of the container opened by the first end portion. The sealing means comprise the enlarged portion. In this embodiment the fluid processing body is a vertically oriented elongated body, wherein the enlarged portion is provided between the first end portion and the second end portion, and wherein the vertically oriented elongated body comprises:

- at least one outlet conduit which is a grooved channel and which is provided on an outer surface of the vertically oriented elongated body in the portion comprised between the first end portion and the enlarged portion;
- a beverage guiding element for guiding the beverage to the second end portion, said beverage guiding element being provided between the enlarged portion and the second end portion.

Additionally, in this embodiment each grooved channel has a variable open cross section, which increases or decreases from the first end portion to the enlarged portion of the fluid processing body. The beverage guiding element has a tapered cross-sectional area which decreases from the enlarged portion to the second end portion of the fluid processing body. The beverage guiding element has preferably a cone-shape, more preferably a truncated cone-shape.

Advantageously, the fluid processing device comprises at least one air or gas inlet bore which is in fluid communication with the inlet means.

According to a preferred aspect of the invention, the fluid processing device comprises a second fluid processing body connected to the fluid processing body. This second fluid processing body is internally provided with a second inlet conduit and comprises a coupling portion for removably coupling the fluid processing device to the beverage preparation machine.

According to another preferred aspect of the invention, the fluid processing device comprises a second fluid processing body connected to the fluid processing body. This second fluid processing body is internally provided with a second inlet conduit and this second inlet conduit has a decreasing cross-sectional area towards the first inlet conduit. The second inlet conduit is preferably provided with at least a first conduit portion, having a first predefined cross-sectional area, and with a second conduit portion, having a second predefined cross-sectional area which is smaller than said first predefined cross-sectional area, wherein the second conduit portion is placed downstream of the first conduit portion and is in fluid communication with the first inlet conduit.

Optionally, at least one through hole can be interposed between the first inlet conduit and a second inlet conduit. This through hole has an average cross-sectional area which is smaller than both the average cross-sectional area of the first inlet conduit and the average cross-sectional area of the second inlet conduit.

Preferably, the ingredient storage container is a one-use container such as a pouch or a sachet or any known container having at least side walls which are flexible. The ingredient storage container can also be any other openable (e.g. pierceable) closed package such as a capsule, a pod, a pad, a bottle, a flow-bag, a canister, or the like. The ingredient storage container can also alternatively be a multi-dose ingredient storage container, having for instance a large storage compartment for storing several doses of ingredient, and a dosing and mixing chamber that is able to receive one dose at a time of ingredient that is transferred from the storage compartment, and wherein said dose of ingredient is mixed with the fluid introduced into the multi-dose ingredient storage container by the fluid processing device. Such multi-dose ingredient storage containers are known in the art (e.g. ingredient canisters). Preferably, the fluid processing device is also able to inject a quantity of air or gas within the ingredient storage container, so as to mix with the fluid and the ingredient and produce a foamy beverage product when it is desired.

BRIEF DESCRIPTION OF THE DRAWINGS

Additional features and advantages of the present invention are described in, and will be apparent from, the description of the presently preferred embodiments, which are set out below with reference to the drawings in which.

DETAILED DESCRIPTION OF THE INVENTION

Figure 1:
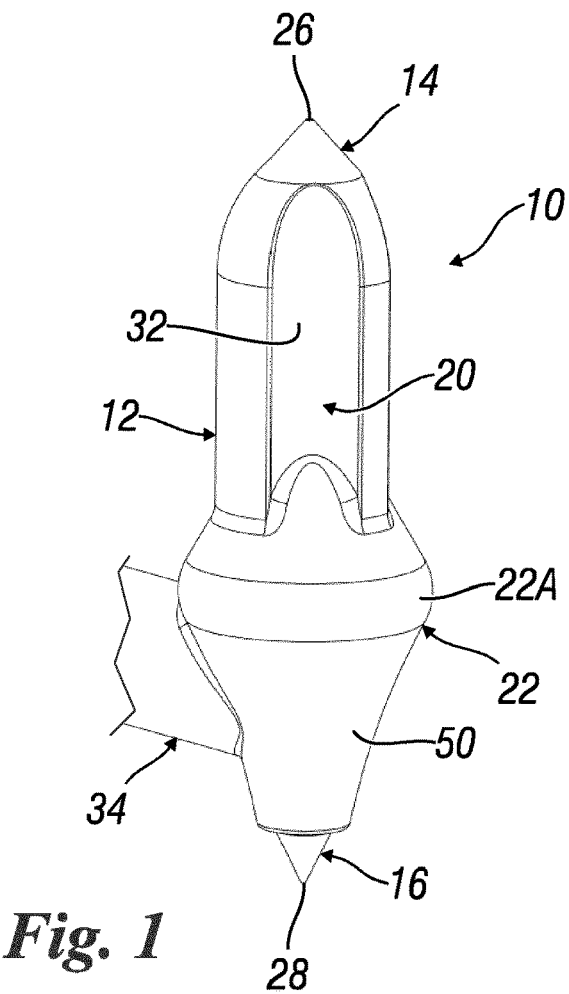
FIG. 1 is a perspective view of a preferred embodiment of a fluid processing device for a beverage preparation machine according to the present invention.
Figure 2:
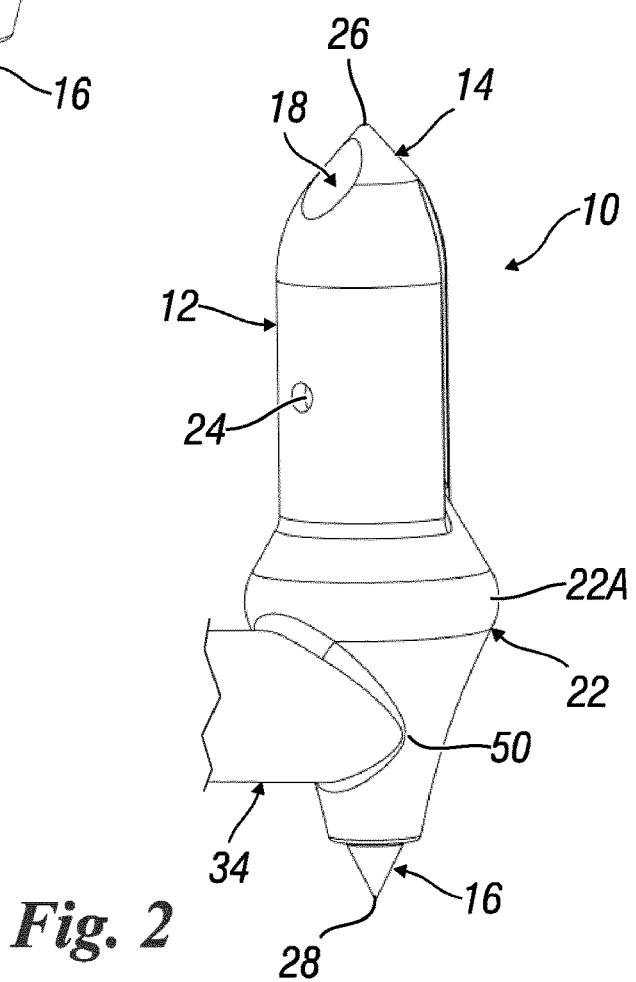
FIG. 2 is another perspective view of the fluid processing device of FIG. 1.
Figure 3:
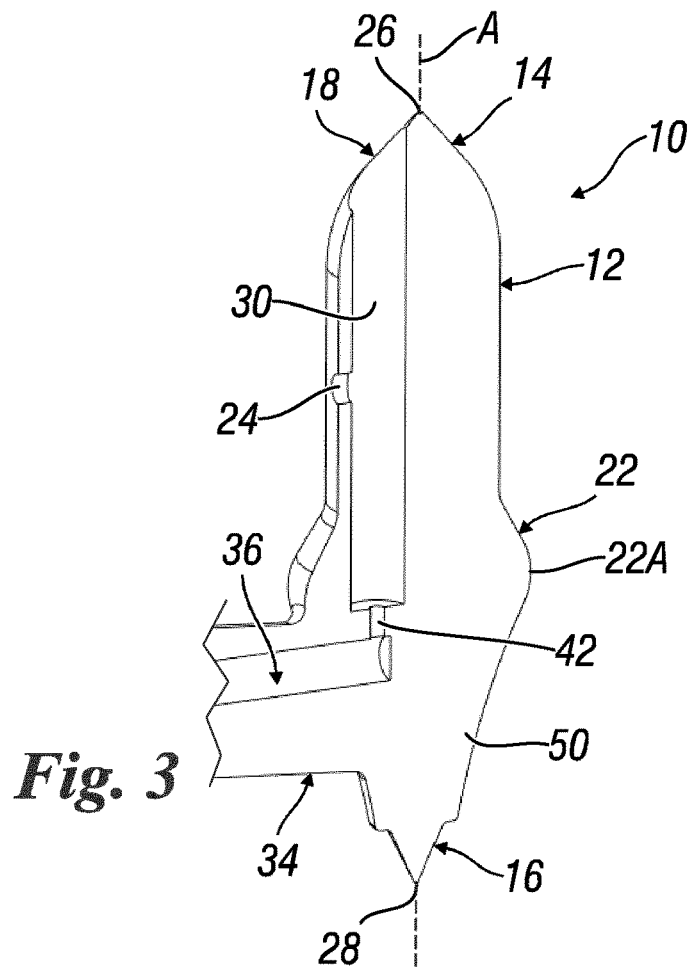
FIG. 3 is a cross-sectional view of the fluid processing device of FIG. 1.
Figure 4:
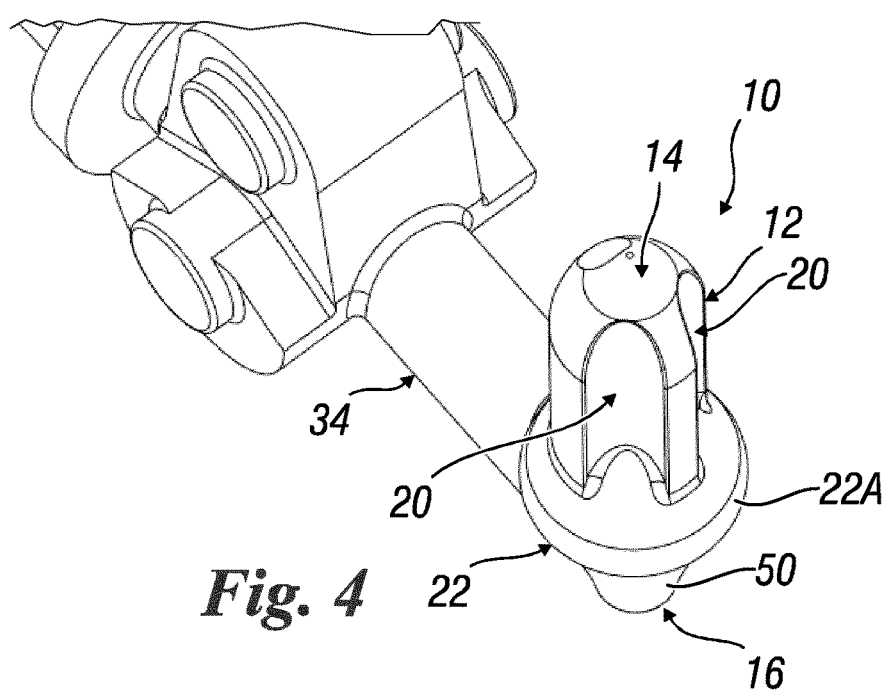
FIG. 4 is still another perspective view of the fluid processing device of FIG. 1, wherein further components of said fluid processing device are shown.

A preferred embodiment of a fluid processing device for a beverage preparation machine according to the present invention is illustrated in FIGS. 1 to 4. The fluid processing device is indicated as a whole with reference numeral 10 and is configured for processing a fluid substance to be introduced into a container C (shown in FIGS. 5A-8C and described in detail hereinafter) for the preparation of a beverage product. The container C is properly inserted into a beverage preparation machine (not shown) and the preparation of a beverage product is obtained by mixing of the fluid substance with an ingredient, for example a soluble ingredient, contained in the container C.

Preferably, the ingredients are chosen within the list of roast and ground coffee, compacted or not, soluble powder coffee or leaf tea. Dairy ingredients (e.g. milk or creamer) could also be provided, as well as chocolate, fruit juices, soups, vegetable juices, bouillons, smoothies, purees, coulis, creams or a combination thereof, in powdered soluble form, liquid concentrated form having various viscosities or in gel form.

With the expression "mixing of the fluid substance with an ingredient" it should be intended that all the ingredients contained in the container C are in a form which is compatible with a generic mixing operation (dissolution, extraction or infusion) with the fluid substance (typically water) to obtain the beverage product.

In the present context, with the term "mixing" is intended whatever combination between the fluid substance and the ingredient. For example, the mixing can be carried out by an infusion process between the fluid substance (typically hot water, that acts as a solvent) and the ingredient (usually a flavour of any kind, e.g. coffee, tea, etc.), or by an actual mixing process between the fluid substance and the ingredient.

The fluid processing device 10 comprises a fluid processing body 12 provided with an inlet portion 14 and with an outlet portion 16. More specifically, the fluid processing body 12 comprises at least one inlet means 18 for introducing the fluid substance into the container C. The inlet means 18 is provided at the inlet portion 14 of the fluid processing body 12. According to the invention, the fluid processing body 12 also comprises at least one outlet means 20 for dispensing, for example into a user's cup placed below the fluid processing body 12, the beverage product from the container C at the outlet portion 16 of said fluid processing body 12.

Preferably, the fluid processing body 12 is a needle-shaped fluid processing body 12. With the term "needle-shaped" it should be intended that the fluid processing body 12 comprises at least one end portion 26, 28 configured for perforating, and/or piercing, and/or tearing a specific portion or wall of the container C before the introduction of the fluid substance into said container C. The fluid processing body 12 is thus shaped in such a way as to be able to at least partially penetrate in the container C.

The needle-shaped fluid processing body 12 could be further provided with at least one sealing means 22 to be engaged with the container C for preventing leakage of the fluid substance and/or the beverage product from said container C in the operative condition of the fluid processing device 10, i.e. at least when the fluid substance is introduced into the container C, as it will be described in detail hereinafter. The inlet means 18 and the outlet means 20 of the needle-shaped fluid processing body 12 are preferably separate one to another and allow, with a single fluid processing device 10, both to introduce the mixing fluid substance (typically hot water) into the container C and to dispense the beverage product formed inside the container C.

Preferably, according to the embodiment shown in the drawings, the needle-shaped fluid processing body 12 comprises a first end portion 26, which is provided at the inlet portion 14 of said needle-shaped fluid processing body 12 and which is configured for opening a specific portion or wall of the container C, and a second end portion 28, which is provided at the outlet portion 16 of said needle-shaped fluid processing body 12. The needle-shaped fluid processing body 12 further comprises at least one first inlet conduit 30 arranged therein. The first inlet conduit 30 is in fluid communication with the first end portion 26 of the needle-shaped fluid processing body 12 and with an inlet port 36A preferably provided at one end of a conduit 36 of a second fluid processing body 34, as it will be described in detail hereinafter. The first inlet conduit 30 and the first end portion 26 are thus comprised in the inlet means 18 of the needle-shaped fluid processing body 12. More precisely, the first inlet conduit 30 is a closed conduit in the form of a tube, embedded in the needle-shaped fluid processing body 12, that allows the fluid substance to be inserted into the container C without being exposed to the air.

As shown in the embodiment of FIGS. 1-8C, the sealing means 22 are preferably provided between the first end portion 26 and the second end portion 28 of the needle-shaped fluid processing body 12. Preferably, the needle-shaped fluid processing body 12 is a vertically oriented elongated body, more preferably a point shaped body, wherein its first end portion 26, its second end portion 28 and the sealing means 22 are coaxially arranged about a longitudinal axis A, which in this case is a vertical axis. More preferably, as shown in the drawings, the first end portion 26 is upwardly oriented with respect to the position of the fluid processing device 10 within the beverage preparation machine. Even more preferably, the first end portion 26 and/or the second end portion 28 of the needle-shaped fluid processing body 12 are point shaped portions respectively. The point shaped first end portion 26 is thus configured for opening, e.g. by perforation, or piercing, or tearing, a specific portion or wall of the container C to inject the fluid substance therein, as it will be explained in detail hereinafter. The point shaped second end portion 28 is downwardly oriented with respect to the position of the fluid processing device 10 in the beverage preparation machine, so as to precisely direct the flow of the beverage product into the user's cup.

The outlet means 20 of the fluid processing device 10 comprises the second end portion 28 of the needle-shaped fluid processing body 12 and at least one outlet conduit 32 which is distinct from the first inlet conduit 30 of the inlet means 18. More specifically, according to the embodiment shown in FIGS. 1-8, each outlet conduit 32 is obtained in the form of a grooved channel provided on the outer surface of the needle-shaped fluid processing body 12. Each grooved channel is thus in fluid communication with the second end portion 28 of the needle-shaped fluid processing body 12.

Preferably the sealing means 22, that are configured to be engaged with the container C for preventing leakage of the fluid substance and/or the beverage product from said container C in the operative condition of the fluid processing device 10, consists of an enlarged portion 22A of the needle-shaped fluid processing body 12. More specifically, this enlarged portion 22A of the needle-shaped fluid processing body 12 is comprised between the first end portion 26 and the second end portion 28 of said needle-shaped fluid processing body 12 and has a cross-sectional area which is larger than any cross-sectional areas of the portion of said needle-shaped fluid processing body 12 comprised between its first end portion 26 and the enlarged portion 22A itself. This enlarged portion 22A of the needle-shaped fluid processing body 12 could be at least partially covered with an elastomeric material to ensure better sealing properties. This enlarged portion 22A of the needle-shaped fluid processing body 12 is thus configured for adhering against a wall of the container C at the portion of said container C opened by the first end portion 26 of the needle-shaped fluid processing body 12.

Conveniently, each outlet conduit 32 in the form of a grooved channel is provided on the outer surface of the vertically oriented needle-shaped fluid processing body 12, in a portion thereof comprised between its first end portion 26 and its enlarged portion 22A. A beverage guiding element 50 for guiding the beverage to the second end portion 28 of the needle-shaped fluid processing body 12 is thus provided between the enlarged portion 22A and said second end portion 28. Preferably, the beverage guiding element 50 has a tapered cross-sectional area which decreases from the enlarged portion 22A to the second end portion 28 of the needle-shaped fluid processing body 12. More preferably, the beverage guiding element 50 has a cone-shape. Even more preferably, the beverage guiding element 50 a truncated cone-shape, with an additional pointed element at the outlet portion 16. The beverage product extracted from the container C is thus guided by the outlet conduit 32 to the second end portion 28 through the beverage guiding element 50, so as to precisely direct the flow of this beverage product into the user's cup placed below said beverage guiding element 50.

The fact that the outlet means 20 of the fluid processing device 10 are placed externally with respect to the needle-shaped fluid processing body 12, together with the fact that said outlet means 20 are obtained in the form of grooved channels, i.e. with an open cross section instead of a closed-loop cross section (which is typical of conventional cylindrical channels), leads to a specific advantage in processing beverage products based on a mixture of a fluid substance and a soluble ingredient. Actually, if the soluble ingredient contained in the container C mostly consist of solid particles, some of these solid particles (e.g. biscuit bits, etc.) remain in their solid state even after the mixing with the fluid substance (e.g. hot water), so as to be properly ingested by the user. Therefore, the open cross section of the outlet means 20 allows these particles to pass, together with the fluid substance, into the user's cup, without the risk of blocking an otherwise designed dispensing cylindrical channel.

Additionally, the grooved channels could have a variable open cross section, which increases or decreases from the first end portion 26 to the enlarged portion 22A of the needle-shaped fluid processing body 12. In other words, the grooved channels can be optionally manufactured with a specific profile (i.e. ramp) from their top to their bottom so that, depending on the height position of the needle-shaped fluid processing body 12 into the container C, the open cross section of grooved channels increases or decreases to adapt the flow rate of the beverage product going out to the cup, and also the fluid pressure inside the container C during mixing.

Optionally, the fluid processing device 10 could be provided with at least one air or gas inlet bore 24, which is in fluid communication with the inlet means 18 and which, in the embodiment of FIGS. 1-8C, is located on the needle-shaped fluid processing body 12 between the first end portion 26 and the sealing means 22. According to the embodiment shown in FIGS. 1-8C, the air or gas inlet bore 24 is in the form of a through hole obtained on a side wall of the needle-shaped fluid processing body 12 and is placed in fluid communication with the first inlet conduit 30 for the fluid adduction. As it will be explained in detail hereinafter, the air or gas inlet bore 24 allows the first inlet conduit 30 to be in contact with the outer environment in certain operation conditions of the fluid processing device 10 and allows the aspiration of a predefined amount of air or gas, to be mixed with the fluid substance and to be introduced into the container C through the first inlet conduit 30, by means of the Venturi effect.

The fluid processing device 10 preferably comprises a second fluid processing body 34 connected to the needle-shaped fluid processing body 12. More preferably, the second fluid processing body 34 is integrally manufactured with the needle-shaped fluid processing body 12 at a conjunction end 44 thereof. The second fluid processing body 34 is internally provided with the second inlet conduit 36 placed in fluid communication with the first inlet conduit 30 of the needle-shaped fluid processing body 12.

According to a preferred aspect of the present invention, as shown for example in FIGS. 5B, 6B, 7B and 8B, the second inlet conduit 36 is a convergent conduit having a decreasing cross-sectional area towards the first inlet conduit 30. More specifically, the second inlet conduit 36 is preferably provided with at least a first conduit portion 38, having a first predefined cross-sectional area, and with a second conduit portion 40, having a second predefined cross-sectional area which is smaller than the first predefined cross-sectional area of the first conduit portion 38. The second conduit portion 40 is placed downstream of the first conduit portion 38 and is in fluid communication with the first inlet conduit 30 obtained in the needle-shaped fluid processing body 12 of the fluid processing device 10.

Additionally, at least one through hole 42 could be interposed between the first inlet conduit 30, obtained in the needle-shaped fluid processing body 12, and the second inlet conduit 36, obtained in the second fluid processing body 34. Conveniently, the through hole 42 has an average cross-sectional area which is smaller than both the average cross-sectional area of the first inlet conduit 30 and the average cross-sectional area of the second inlet conduit 36.

The specific configuration of the second fluid processing body 34, with its convergent cross-sectional profile, and the presence of the through hole 42 allow to properly set the speed of the fluid substance introduced into the container C by the fluid processing device 10. Actually, the convergent cross-sectional profile of the second fluid processing body 34 allows a speed increase of the fluid substance pumped by the beverage preparation machine into the fluid processing device 10. Additionally, the through hole 42 is provided for further increasing the speed of the fluid substance before it runs out of the first inlet conduit 30 of the needle-shaped fluid processing body 12. The presence of the through hole 42 ensure a good dissolution of the ingredient(s) and beverage product reconstitution. The through hole 42 defines the flow and the pressure of the fluid substance during the beverage product reconstitution. The through hole 42 may also have an "anti-backflow" function, so as to reduce the risk of fluid substance going back from the container C into the fluid line consisting of the sequence of the first inlet conduit 30, the through hole 42 itself and the second inlet conduit 36.

According to a preferred aspect of the present invention, the second fluid processing body 34 is orthogonally disposed with respect to the needle-shaped fluid processing body 12, so that the first inlet conduit 30 is substantially orthogonal with respect to the second inlet conduit 36. Therefore, when the fluid processing device 10 is properly connected to the beverage preparation machine in its operative condition, the needle-shaped fluid processing body 12 is oriented along a substantially vertical direction (shown by the axis A in FIG. 3), with its first end portion 26 located at the top and its second end portion 28 located at the bottom, whereas the second fluid processing body 34 is substantially horizontal. As a consequence, in the operative condition of the fluid processing device 10, the first inlet conduit 30 is oriented along a substantially vertical direction, whereas the second inlet conduit 36 is oriented along a substantially horizontal direction.

The second fluid processing body 34 could be provided with a coupling portion 46 for removably coupling the fluid processing device 10 to the beverage preparation machine. This removably coupling allows the fluid processing device 10 to be removed from the beverage preparation machine and to be washed separately with respect to this machine, for example in a dishwasher. The coupling portion 46 is placed at an opposite end of the second fluid processing body 34 with respect to its conjunction end 44 with the needle-shaped fluid processing body 12. As shown in the drawings, the coupling portion 46 can be internally provided with at least one third inlet conduit 48 having an average cross-sectional area which is greater than the average cross-sectional area of the second inlet conduit 36 of the second fluid processing body 34, so as to additionally increase the speed of the fluid substance before it runs out of the first inlet conduit 30 of the needle-shaped fluid processing body 12.

Figure 5A:
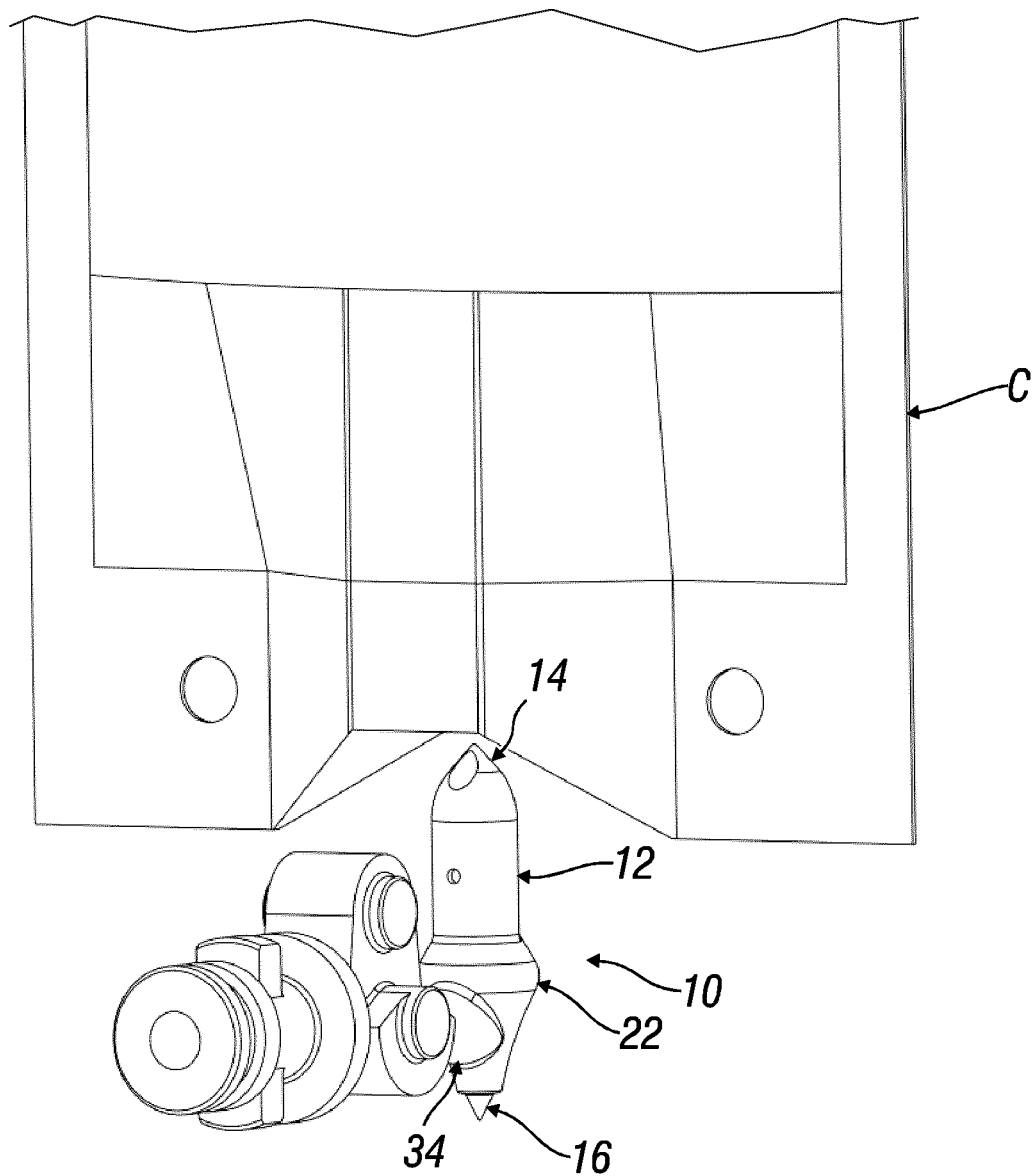
FIGS. 5A-5C show, in a first perspective view, in a cross-sectional view and in a second perspective view respectively, the fluid processing device of FIG. 1 in a non-operative condition, i.e. before the introduction of the fluid into the ingredient storage container.
Figure 5B:
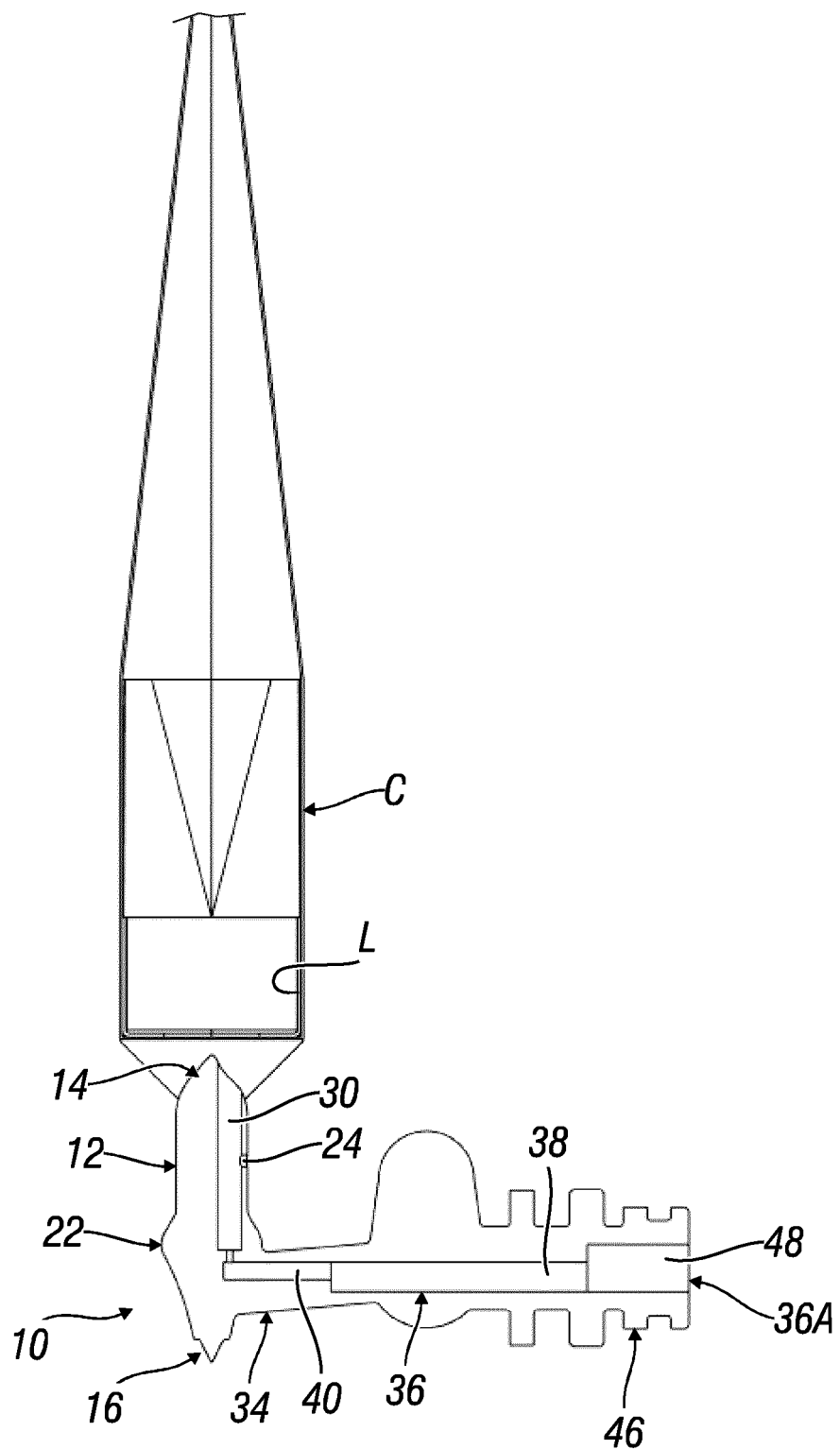
Figure 5C:
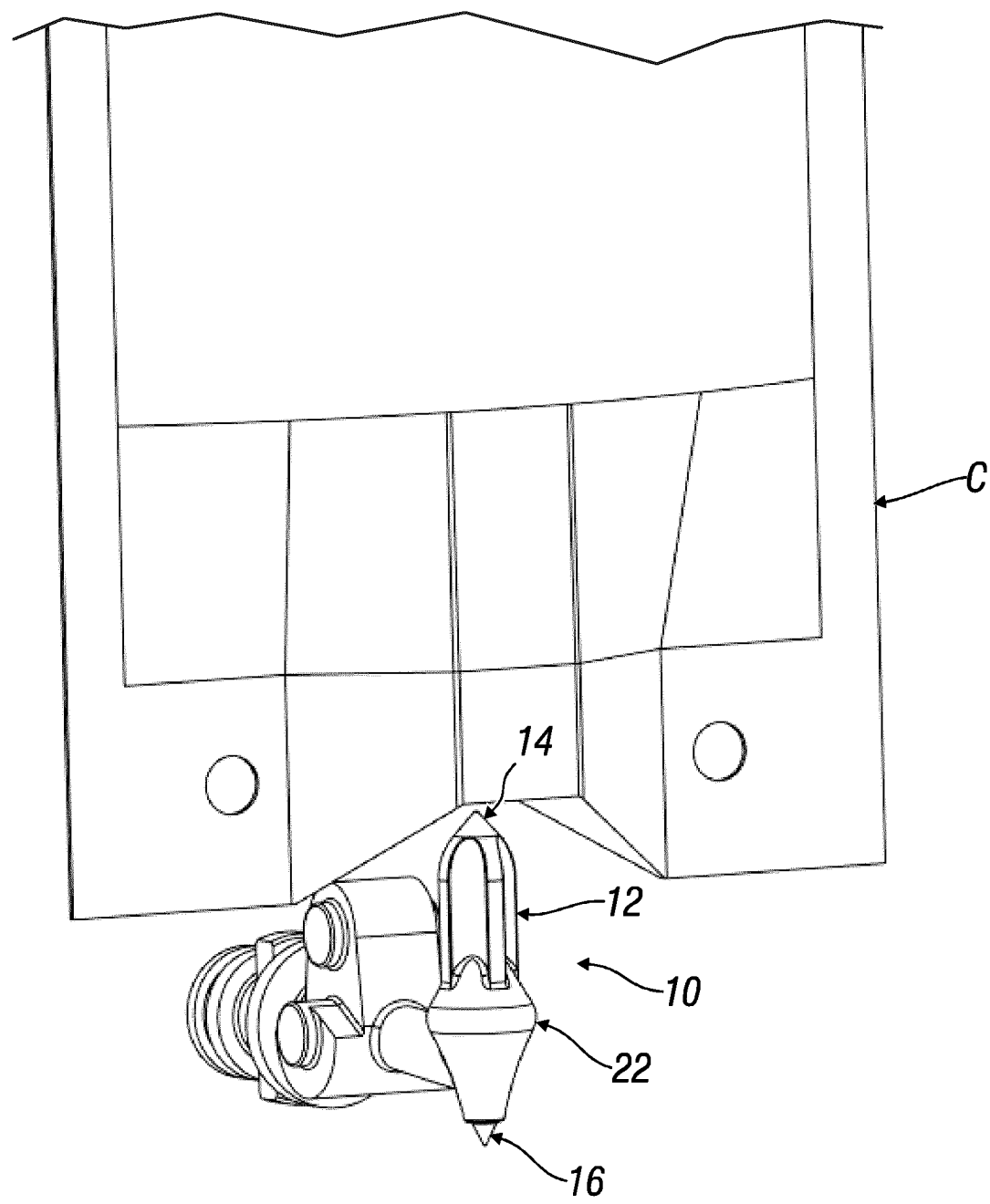

In FIGS. 5A-5C, in a first perspective view, in a cross-sectional view and in a second perspective view respectively, a non-operative condition of the fluid processing device 10 is shown. In this non-operative condition, the fluid processing device 10 is shown outside the container C, i.e. before the introduction of the fluid substance into said container C through the inlet means 18. In other words, in this non-operative condition no fluid substance and other substances pass through the inlet means 18 and the outlet means 20 of the fluid processing device 10.

Figure 6A:
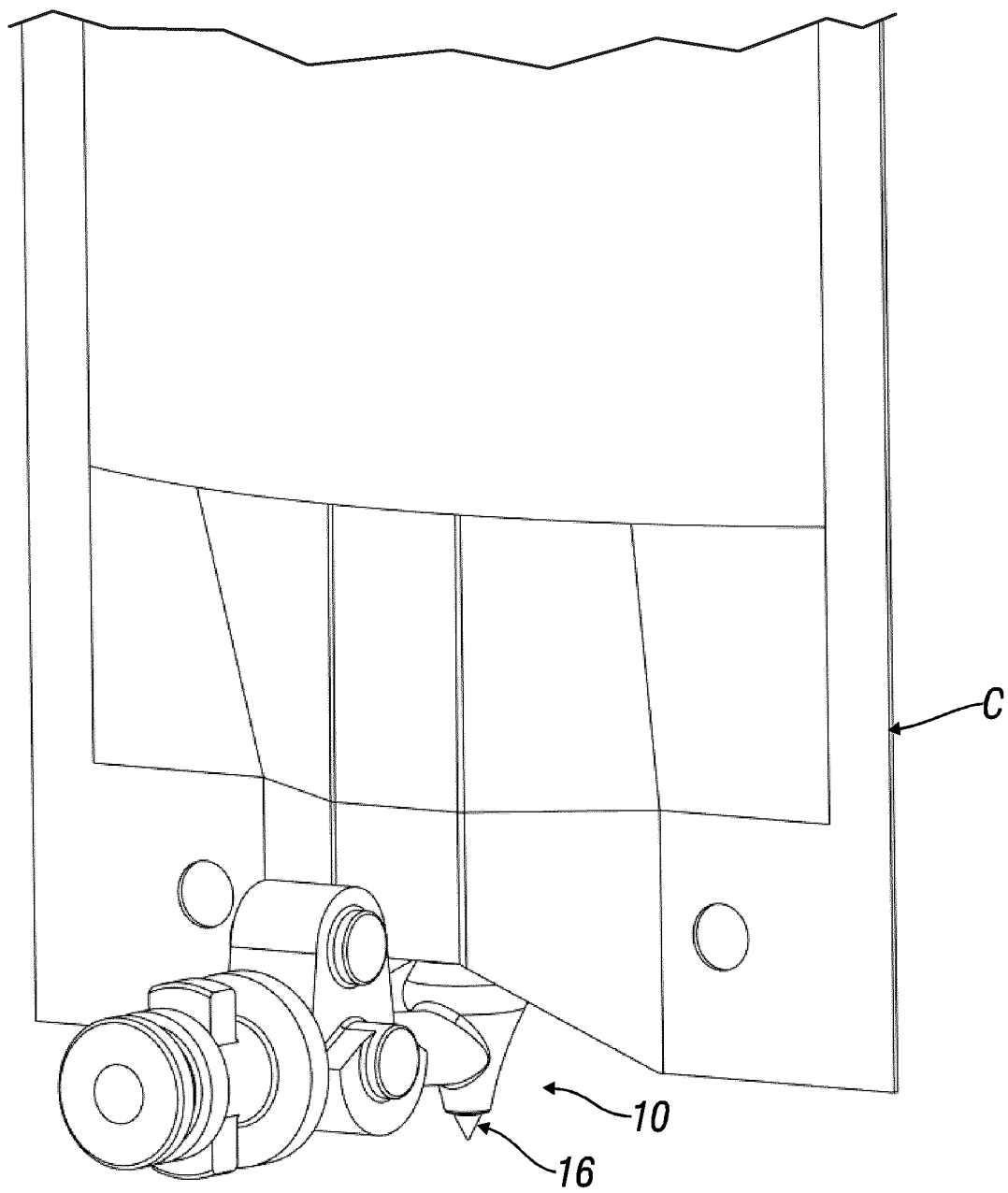
FIGS. 6A-6C show, in a first perspective view, in a cross-sectional view and in a second perspective view respectively, the fluid processing device of FIG. 1 in a first operative position, wherein said fluid processing device protrudes inside the ingredient storage container in a sealing manner, such that the fluid can be introduced into the ingredient storage container and no leakage of this fluid outside said container is allowed.
Figure 6B:
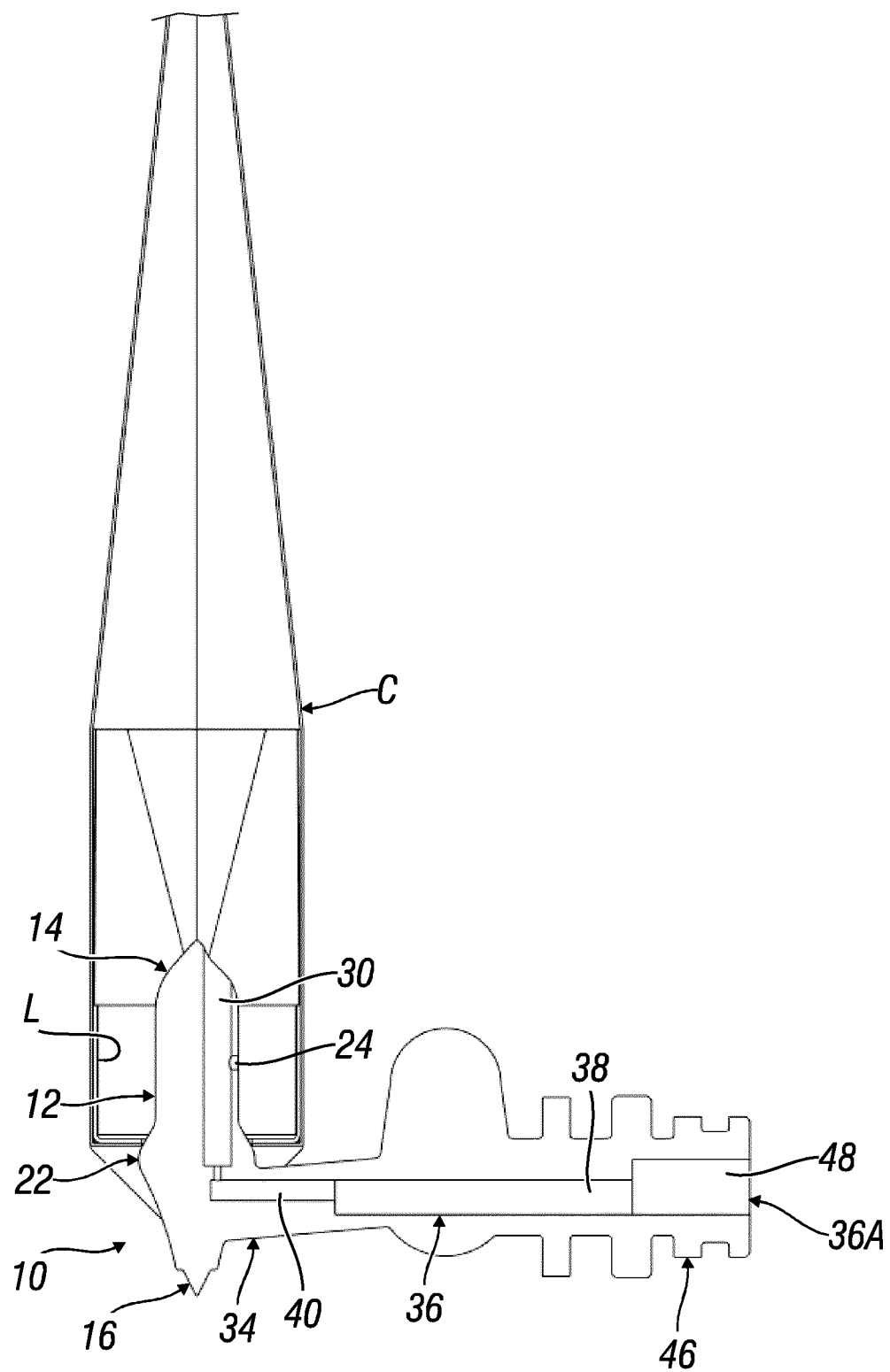
Figure 6C:
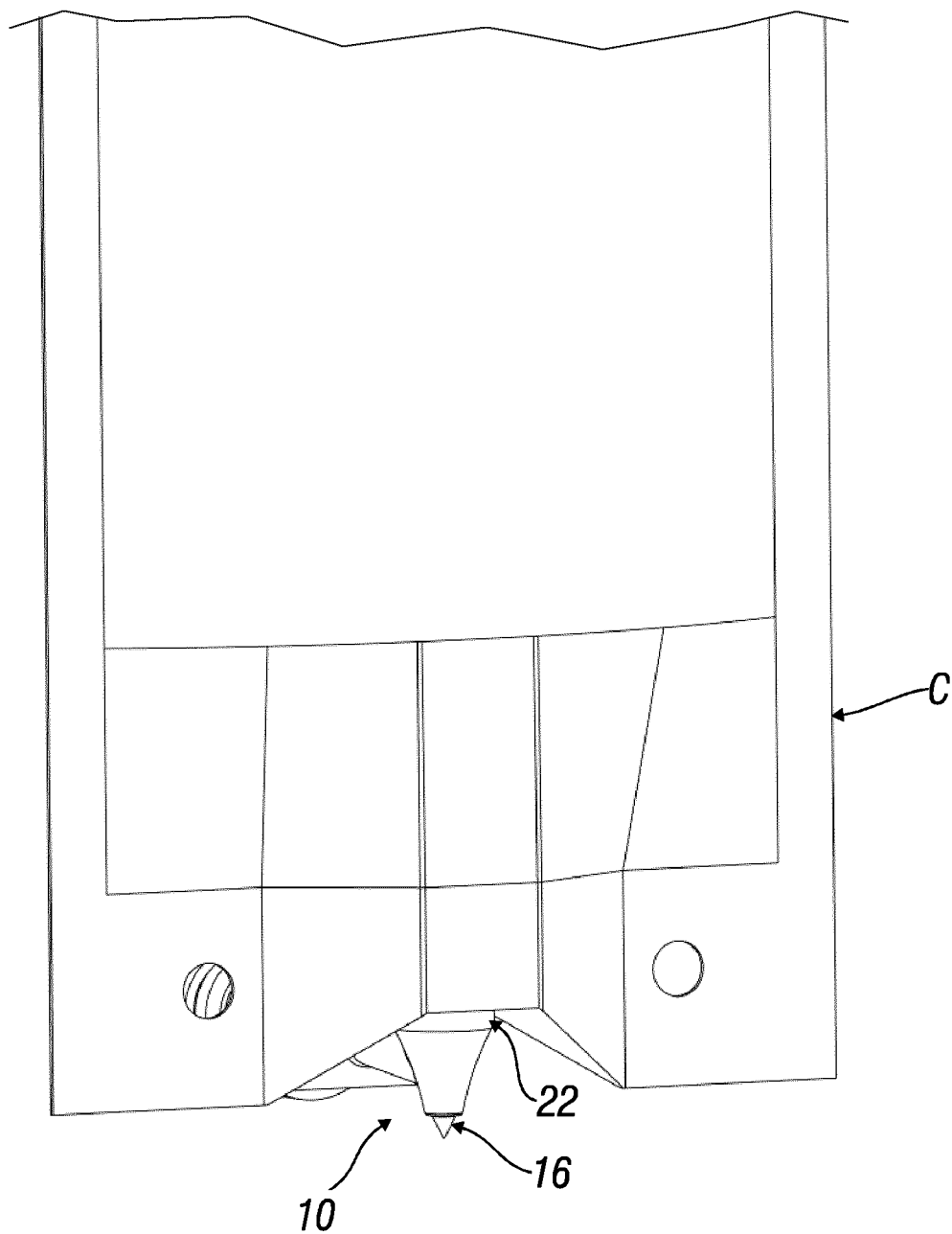

In FIGS. 6A-6C, in a first perspective view, in a cross-sectional view and in a second perspective view respectively, a first operative condition of the fluid processing device 10 is shown. In this first operative condition, at least a portion of the needle-shaped fluid processing body 12 protrudes inside the container C such that the fluid substance can be introduced therein by the inlet means 18.

In this first operative condition, it is preferred but not indispensable that the sealing means 22, i.e. the enlarged portion 22A of the needle-shaped fluid processing body 12 in the embodiment shown in FIGS. 1-8, are in contact with the bottom wall of the container C. In this embodiment the outlet means 20, i.e. the outlet conduits 32 in the form of grooved channels, are provided on the side wall of the needle-shaped fluid processing body 12 in a position which is above the position of the enlarged portion 22A of said needle-shaped fluid processing body 12. In this way, in the first operative condition of the fluid processing device 10 the outlet conduits 32 are completely inserted into the container C and, due to the sealing engagement between the sealing means 22 and said container C, no leakage or few leakage of any fluid substance and/or other substances from the container C is allowed.

Figure 9:
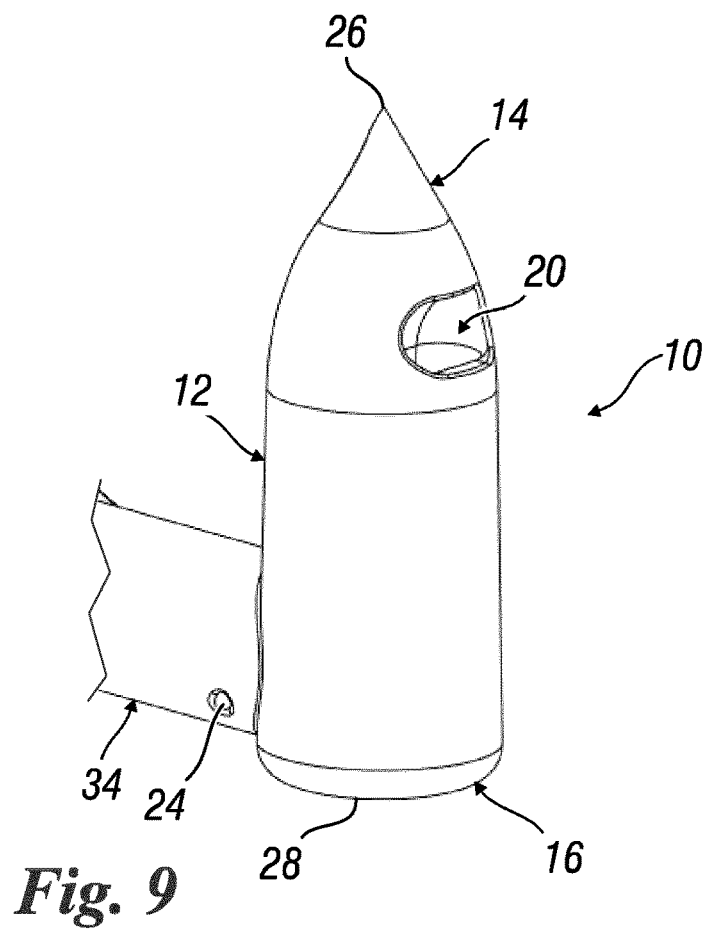
FIG. 9 is a perspective view of another possible embodiment of a fluid processing device for a beverage preparation machine according to the present invention.
Figure 10:
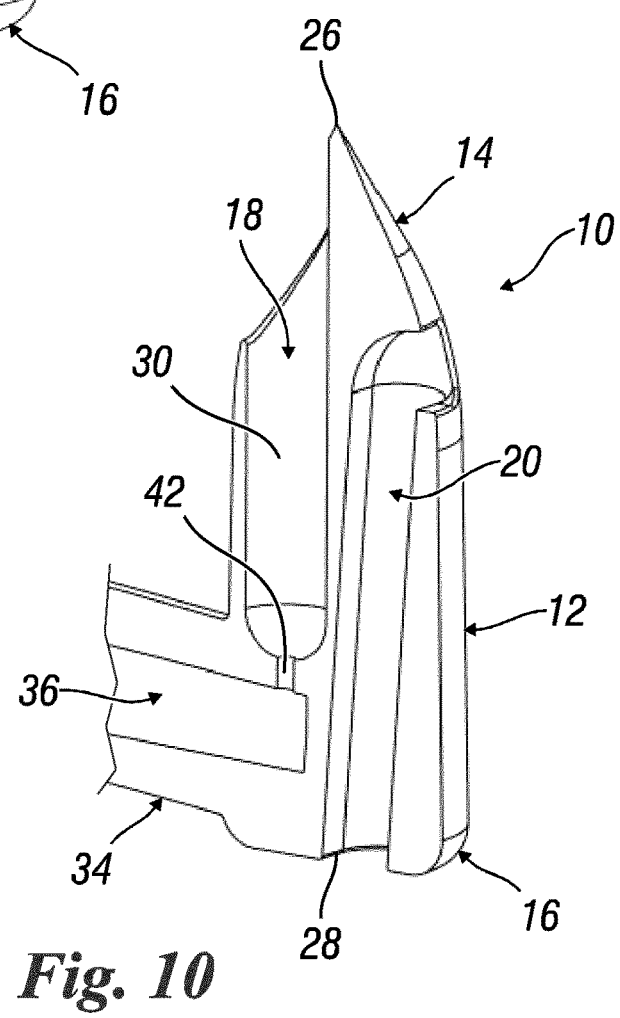
FIG. 10 is a cross-sectional view of the fluid processing device of FIG. 9.

In the embodiment shown FIGS. 1-8, the needle-shaped fluid processing body 12 of the fluid processing device 10 is a point shaped body provided with a first point shaped end portion 26 at its inlet portion 14. Therefore, this point shaped end portion 26 is configured for perforating, and/or piercing, and/or tearing a specific portion or wall of the container C to inject the fluid substance therein. However, as it will be explained hereinafter, other embodiments of the needle-shaped fluid processing body 12 could be envisaged, with an inlet portion 14 configured in a different way for reaching the first operative condition of the fluid processing device 10 in a different way, for example the embodiments of FIGS. 9 and 10, described in more detail hereinafter.

In the specific embodiment of the fluid processing device 10 of FIGS. 1-8 the container C is preferably manufactured from a multilayer flexible material, more preferably made essentially of a paper layer. Preferably, this container C is thus internally provided, in its lower portion, i.e. at the portion that is engaged by the fluid processing device 10, with an additional layer L of a substantially rigid material. This substantially rigid material can be, for example, a compostable plastic capable of forming a barrier against oxygen and moisture. Compostable means that the whole container C can be discarded after usage together with fruit and vegetable peels. Other embodiments of the container C are however possible, but it is essential that, in the specific embodiments of the fluid processing device 10 shown in the figures, such a container C has a substantially rigid portion at the contact area with the needle-shaped fluid processing body 12, since the relative rigidity of at least a portion of the container C is advantageous for cooperating with the sealing means 22 of the needle-shaped fluid processing body 12.

The preferably substantially rigid layer of the container C is provided, at its bottom, with an injection hole having a cross-sectional shape (e.g. a circular cross-sectional shape) that is compatible with the cross-sectional shape of the needle-shaped fluid processing body 12, i.e. the cross-sectional shape of the point shaped body. In the non-operative condition of the fluid processing device 10, the injection hole is closed by a bottom portion of the multilayer flexible material of the container C. In case of circular cross-sectional shape, the diameter of the injection hole is greater than the average diameter of the point shaped body, but is smaller or equal than the maximum diameter of the sealing means 22 (if these sealing means 22 are provided on the needle-shaped fluid processing body 12), i.e. of the enlarged portion 22A of the point shaped body. With this configuration the needle-shaped fluid processing body 12 is capable of being introduced into the container C through the injection hole (breaking or tearing the portion of the multilayer flexible material that closes said injection hole), during the movement of the needle-shaped fluid processing body 12 towards the container C, until the sealing means 22 have reached their sealing position against the circumferential edge of said injection hole. In this sealing position no further movement between the needle-shaped fluid processing body 12 and the container C is allowed, thus obtaining the first operative condition described above and shown in FIGS. 6A-6C.

Figure 7A:
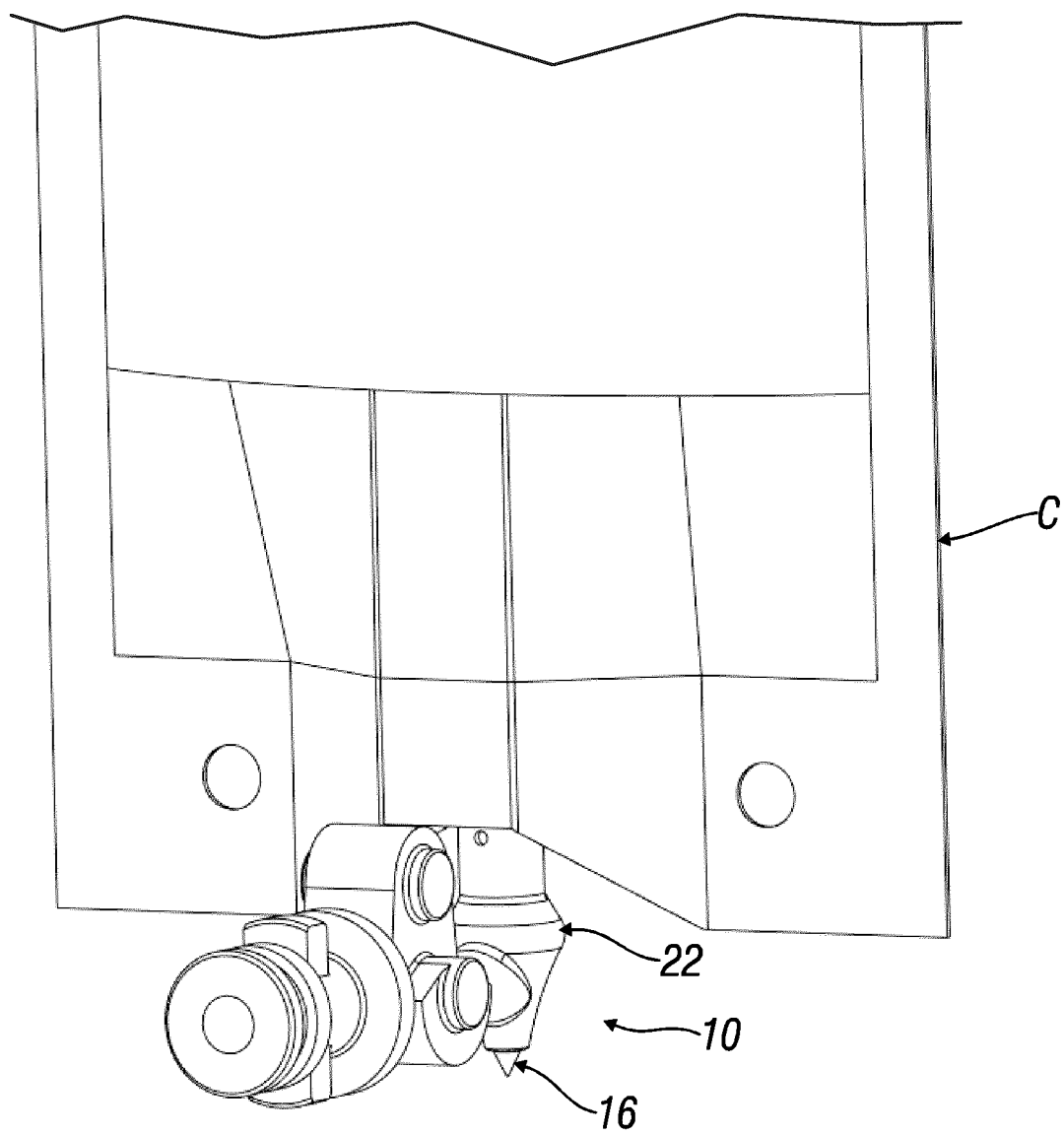
FIGS. 7A-7C show, in a first perspective view, in a cross-sectional view and in a second perspective view respectively, the fluid processing device of FIG. 1 in a second operative position, wherein said fluid processing device protrudes inside the ingredient storage container such that both the fluid and a predefined amount of air or gas can be introduced therein and, at the same time, the resulting beverage product can go out towards a user's cup.
Figure 7B:
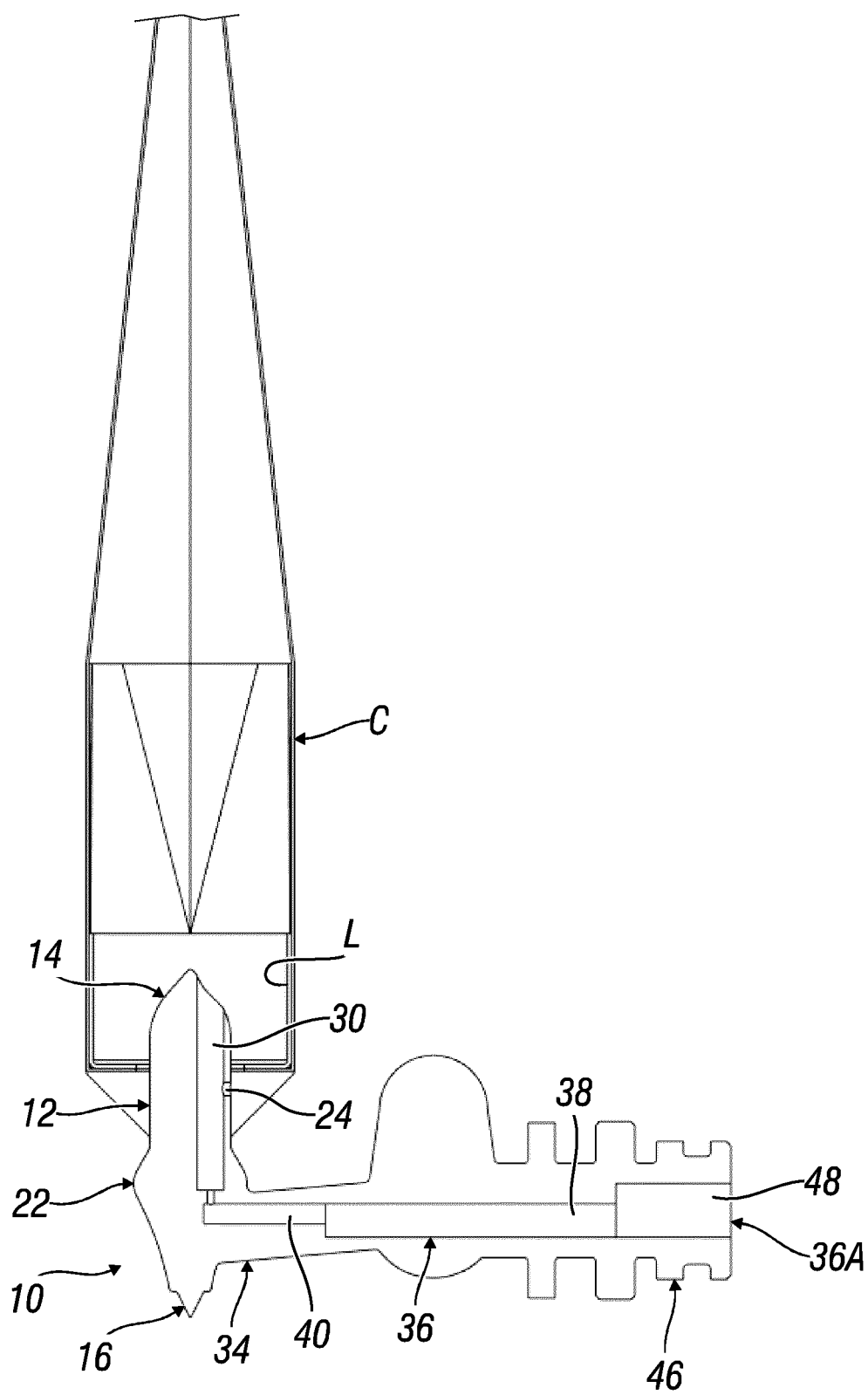
Figure 7C:
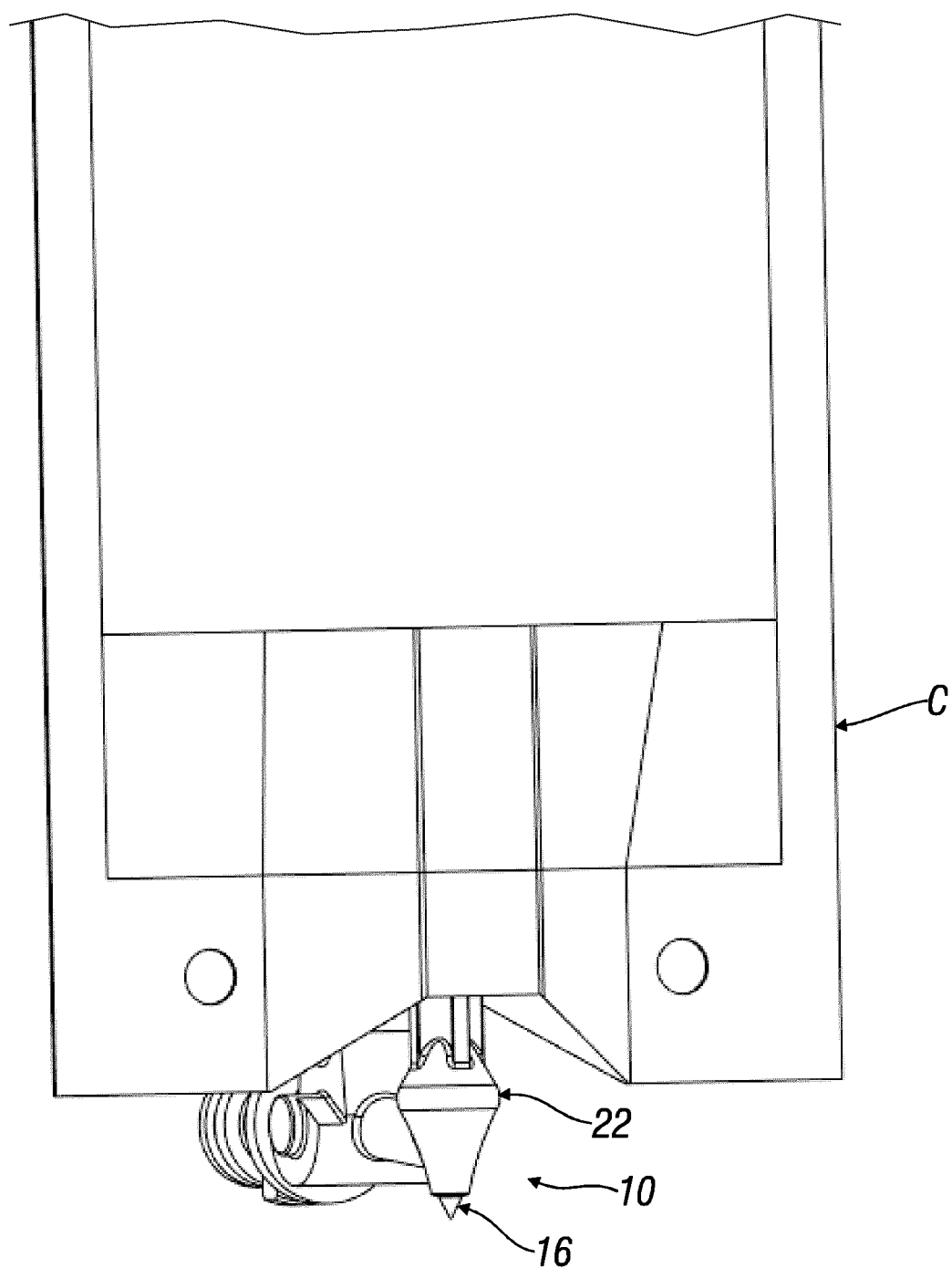

In FIGS. 7A-7C, in a first perspective view, in a cross-sectional view and in a second perspective view respectively, a second operative condition of the fluid processing device 10 is shown. In this second operative condition at least a portion of the needle-shaped fluid processing body 12 still protrudes inside the container C, similarly to what happens in the first operative condition described above, but the sealing means 22 are not in tight contact with the bottom wall of the container C. In other words, in this second operative condition a smaller portion of the needle-shaped fluid processing body 12, compared to the first operative condition, protrudes inside the container C (this fact is also visible from a comparison between FIG. 6B and FIG. 7B), so that both the fluid substance can be introduced inside the container C by the inlet means 18 and, simultaneously, the resulting beverage product can go out through the outlet means 20.

More specifically, in this second operative condition the needle-shaped fluid processing body 12 protrudes inside the container C in such a way that its air or gas inlet bore 24 remains outside said container C. Therefore, in this second operative condition, injection of air or gas into the container C is possible together with the injection of fluid substance by means of the Venturi effect. It should be noted that the Venturi effect, which is obtained due to the simultaneous injection of fluid substance and air or gas into the container C, occurs only when the injection of fluid substance into the container C is carried out by the inlet means 18. Actually, as soon as the injection of fluid substance into the container C through the inlet means 18 stops, the Venturi sucking effect through the air or gas inlet bore 24 cannot work anymore. Therefore, no Venturi effect occurs in the extraction mode only, i.e. when the beverage product has been fully prepared and flows out through the outlet means 20.

Basically, the Venturi effect is the fact that when the fluid substance circulates at high speed within the inlet means 18 of the fluid processing device 10, it pulls in a quantity of air or gas through the air or gas inlet bore 24. This is due to an aspiration which is a physical property known in the field of fluid mechanics. When air or gas is pulled in (i.e. sucked) into the flow of fluid substance which is injected into the container C, this air or gas too is mixed with the soluble ingredient. The mixture consisting of soluble ingredient, fluid substance and air or gas creates a foaming boost, which is needed for foamy beverage products (foamed milks, creamy chocolates, etc.).

Obviously, the sucking effect of air or gas together with the fluid substance can only work if the air or gas inlet bore 24 is located outside the container C. Therefore, the Venturi effect can be stopped if the needle-shaped fluid processing body 12 is sufficiently inserted within the container C so that the air or gas inlet bore 24 is located inside the container C, such as in the third operative condition of the fluid processing device 10 described below.

Figure 8A:
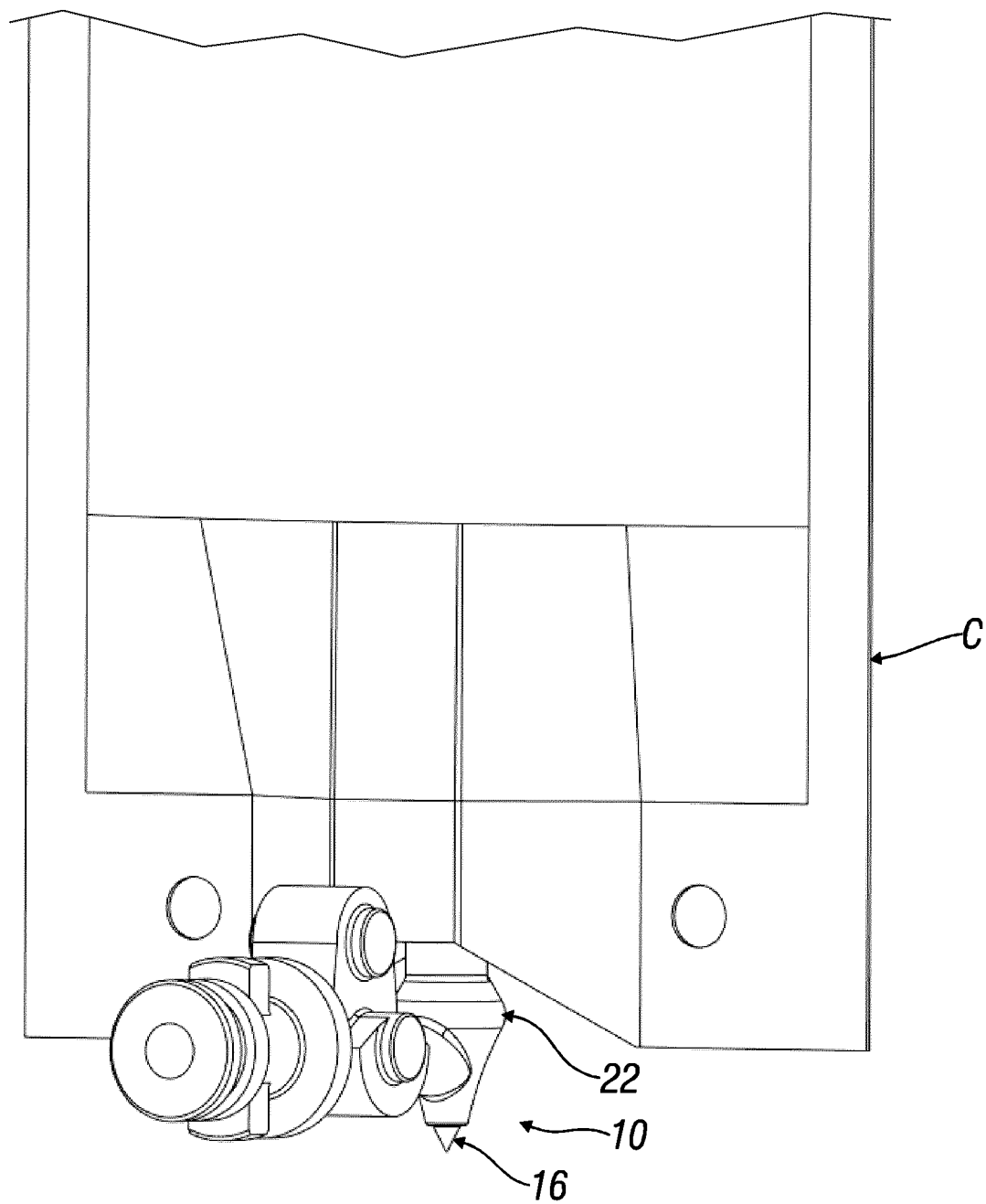
FIGS. 8A-8C show, in a first perspective view, in a cross-sectional view and in a second perspective view respectively, the fluid processing device of FIG. 1 in a third operative position, wherein said fluid processing device protrudes inside the ingredient storage container such that the fluid only can be introduced therein and, at the same time, the resulting beverage product can go out towards a user's cup.
Figure 8B:
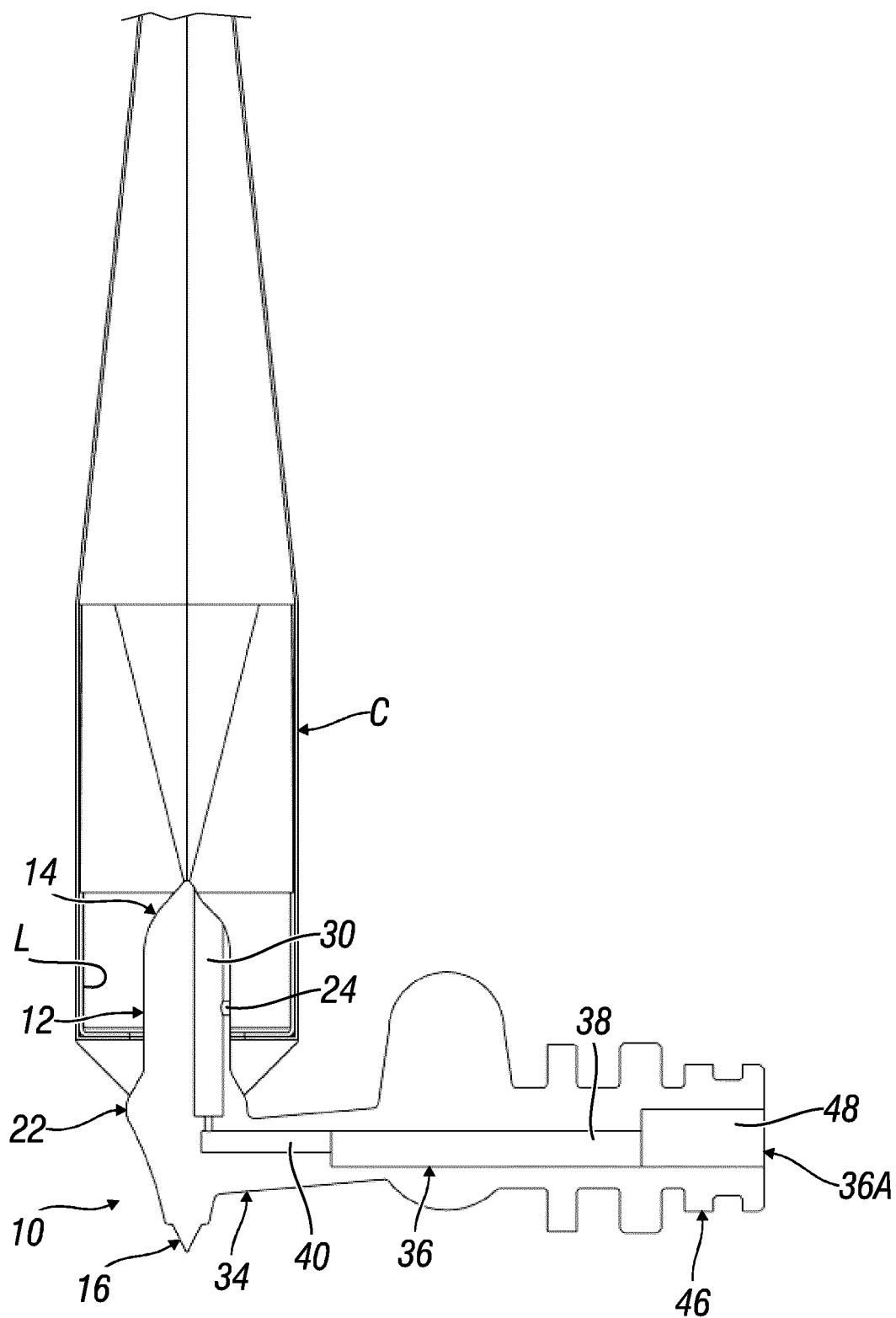
Figure 8C:
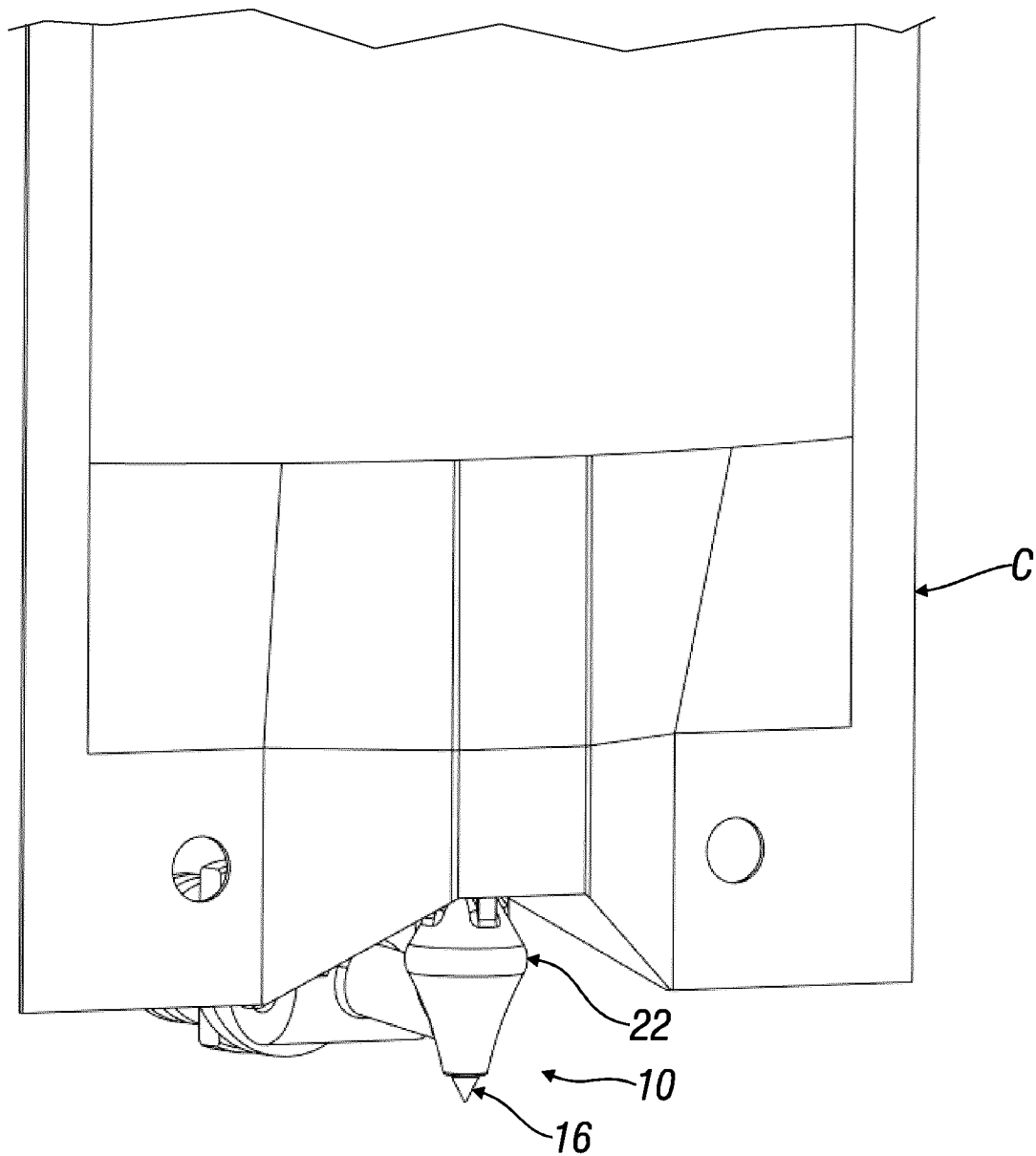

In FIGS. 8A-8C, in a first perspective view, in a cross-sectional view and in a second perspective view respectively, a third operative condition of the fluid processing device 10 is shown. This third operative condition is basically similar to the second operative condition described above, except for the fact that the needle-shaped fluid processing body 12 is inserted within the container C so that the air or gas inlet bore 24 too is located inside the container C (see in particular FIG. 8B), whereas the sealing means 22 are once again not in tight contact with the bottom wall of said container C.

Therefore, in this third operative condition both the fluid substance can be introduced inside the container C by the inlet means 18 and, simultaneously, the resulting beverage product can go out through the outlet means 20 towards the cup. However, no Venturi effect occurs in this third operative condition and no air or gas is injected into the container C through the air or gas inlet bore 24, but just fluid substance is introduced into the container C during the injection phase.

Regardless of the Venturi effect, both in the second operative condition and in the third operative condition the fluid substance is injected into the container C through the inlet means 18 of the needle-shaped fluid processing body 12. The fluid substance injected into the container C is mixed with the soluble ingredient (e.g. coffee powder) to create the beverage product. In these operative conditions also, the needle-shaped fluid processing body 12 is partly out of the container C so that the dispensing grooved channels are always at least partially located outside of the container C (i.e. the dispensing grooved channels are open), and therefore they are able to let the beverage product out of the container C, into the user's cup. Therefore, simultaneously with the injection of fluid substance into the container C, beverage product is also dispensed towards the user's cup.

In all the operative conditions described above it is seen that the container C is fixed within the beverage preparation machine, whereas the fluid processing device 10 is moved relatively to said container C to reach the respective operative conditions. Alternatively, the fluid processing device 10 could be maintained fixed within the beverage preparation machine, whereas the container C is moved relatively to said fluid processing device 10, so that the needle-shaped fluid processing body 12 could be introduced into the container C through the respective injection hole, in the different operative conditions described above, during a movement of the container C towards the needle-shaped fluid processing body 12.

In all the preferred embodiments of the fluid processing device 10 described herein the relative movement between said fluid processing device 10 and the container C is a vertical movement, i.e. substantially directed along the vertical axis A of the needle-shaped fluid processing body 12. However, it should be pointed out that, in possible different embodiments of the fluid processing device 10 (not shown in the drawings), the relative movement between said fluid processing device 10 and the container C can also be directed differently, e.g. horizontally or along any inclined axis, that is, an axis inclined according to any suitable angle with respect to a vertical and/or horizontal axis.

It should be understood that various changes and modifications to the presently preferred embodiment of the fluid processing device 10 described herein will be apparent to those skilled in the art. Such changes and modifications can be made without departing from the scope of the present invention covered by the appended claims.

For example, in FIGS. 9-13 further embodiments of the fluid processing device 10 according to the present invention are shown. In these embodiments the fluid processing body 12 has a different shape with respect to that disclosed hereinbefore with reference to FIGS. 1-8. More precisely, the outlet means 20 are different from the outlet conduits 32 in the form of outer grooved channels, since the function of the outlet means 20 could be performed by other outlet guide elements. For example, in the embodiments shown in FIGS. 9-13 the outlet means 20 comprise also at least an outlet conduit arranged inside the fluid processing body 12, similarly to the first inlet conduit 30. In other embodiments these outlet guide elements could be the outer surface of the fluid processing body 12 and/or one or more outlet conduit arranged inside the fluid processing body 12 and/or one or more outlet conduit arranged on the outer surface of the fluid processing body 12.

In the embodiments of FIGS. 9-13 no specific sealing means are provided on the outer surface of the fluid processing body 12. However, a certain sealing function can be performed by a specific portion (not necessarily an "enlarged" portion) of the outer surface of the fluid processing body 12 located below the inlet means 18. If provided, also this specific portion of the outer surface of the fluid processing body 12 can be configured for adhering against a wall of the container C at the portion of said container C opened by the first end portion 26 of the fluid processing body 12. Preferably, in the embodiments of FIGS. 9-13, no sealing means 22 of any kind are provided between the fluid processing body 12 and the container C, with the result of a small or negligible leakage of fluid substance that falls into the user's cup during beverage preparation.

Advantageously, in the embodiments of FIGS. 9-13 the outer surface of the fluid processing body 12 is tapered. Always advantageously, the inlet conduit of the second fluid processing body 34 has a decreasing cross-sectional area towards the first inlet conduit 30 as disclosed for the embodiment of FIGS. 1-8. Additionally, it has to be noted that at least one of the first end portion 26 and/or the second end portion 28 of the fluid processing body 12 may not be point shaped, but it could be a substantially flat portion or slightly curved portion. Actually, also a substantially flat first end portion 26 of the fluid processing body 12 could effectively open a specific portion or wall of the container C, for example by pushing this portion or wall inside the container C and/or detaching or desealing it from the container C. In this case, the container C is designed in such a way that a specific portion or wall is welded or glued to the container's bottom, such that it covers and closes a through hole provided at this bottom. Alternatively, this specific portion or wall could be provided with a sort of weakening profile that allows the first end portion 26 of the fluid processing body 12 to detach, or deseal, and/or push this portion or wall inside the container C. According to this embodiment not having a point shaped first end portion 26, the fluid processing body 12 may have any suitable shape, not necessarily a needle shape.

Figure 11:
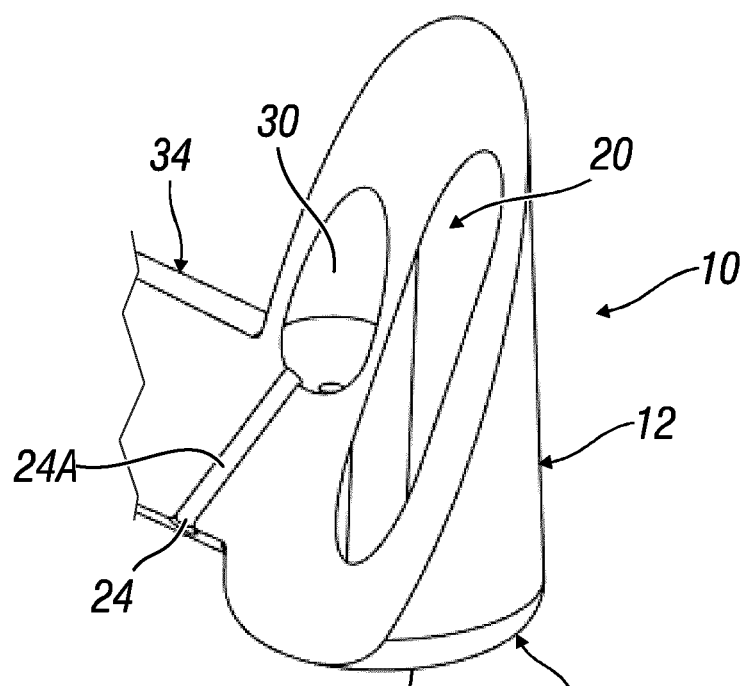
FIG. 11 is another cross-sectional view of the fluid processing device of FIG. 9.
Figure 12:
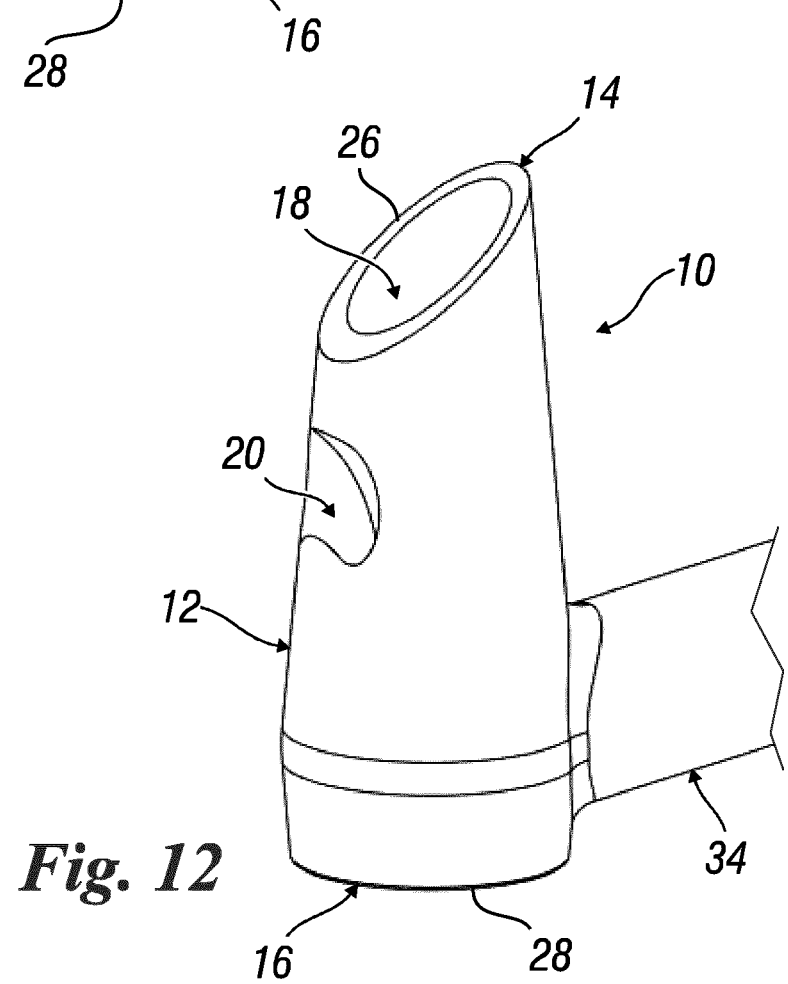
FIG. 12 is a perspective view of a further possible embodiment of a fluid processing device for a beverage preparation machine according to the present invention.
Figure 13:
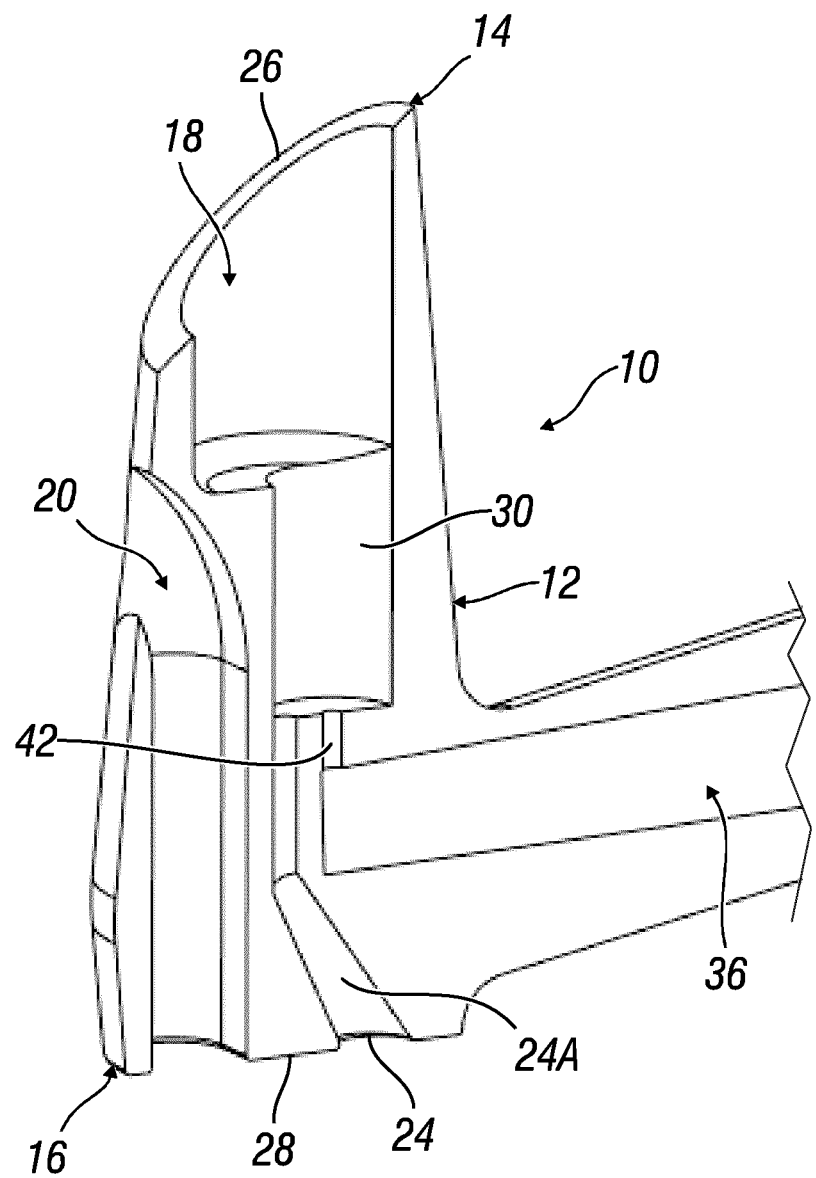
FIG. 13 is a cross-sectional view of the fluid processing device of FIG. 12.

In the embodiments of FIGS. 9-13 the optional gas inlet bore 24 can be positioned on the fluid processing device 10 in such a way that it remains outside the container C with a Venturi effect, such as in the second operative condition of the embodiment of FIGS. 1-8, or can be located inside the container C without Venturi effect, such as in the third operative condition of the embodiment of FIGS. 1-8. Preferably, in the embodiment of FIGS. 9 and 10 the gas inlet bore 24 is positioned on the second fluid processing body 34 of the fluid processing device 10 and is always in fluid communication with the inlet means 18 of the fluid processing body 12 through a dedicated conduit 24A (shown in FIG. 12). In this embodiment of FIGS. 9 and 10 the gas inlet bore 24 is in a position on the fluid processing device 10 such that said gas inlet bore 24 always remains outside the container C, thus always providing for the Venturi effect. In the embodiment of FIGS. 11-13 the gas inlet bore 24 is positioned of the fluid processing body 12 at the second end portion thereof, i.e. the lower portion of the fluid processing body 12, and is always in fluid communication with the inlet means 18 of the fluid processing body 12 through a dedicated conduit 24A (shown in FIG. 14). Also in this embodiment of FIGS. 11-13 the gas inlet bore 24 is in a position on the fluid processing device 10 such that said gas inlet bore 24 always remains outside the container C, thus always providing for the Venturi effect. According to further modifications of the fluid processing device 10, not shown in the drawings, the optional gas inlet bore 24 could be arranged on the fluid processing body 12 and/or on the second fluid processing body 34 in different positions, such that it always remains outside the container C, thus always providing for the Venturi effect.

In view of all the embodiments described so far, it should be intended that the term "opening", when referred to a specific portion or wall of the container C, means: perforating, or piercing, or tearing, or detaching, or desealing, or pushing inside the container C, or opening in any equivalent manner, this specific portion or wall of the container C before the introduction of the fluid substance into said container C.

The invention claimed is:

1. A fluid processing device for a beverage preparation machine, the fluid processing device being configured for processing a fluid substance to be introduced into a container (C) for the preparation of a beverage product by mixing of the fluid substance with an ingredient contained in the container (C), the fluid processing device comprising a fluid processing body provided with an inlet portion, wherein the fluid processing body comprises:
   at least one inlet member for introducing the fluid substance into the container (C), the at least one inlet member being provided at the inlet portion;
   an outlet portion;
   at least one outlet member for dispensing the beverage product from the container (C), the at least one outlet member being provided at the outlet portion; and
   at least one sealing member to be engaged with the container (C) for preventing leakage of the fluid substance and/or the beverage product from the container (C) at least when the fluid substance is introduced into the container (C).

2. Fluid processing device according to claim 1, wherein the fluid processing body is a needle-shaped fluid processing body, comprising at least one end portion configured for perforating, and/or piercing and/or tearing a specific portion or wall of the container (C) before the introduction of the fluid substance into the container (C).

3. Fluid processing device according to claim 1, wherein the fluid processing body further comprises:
   a first end portion provided at the inlet portion, the first end portion being configured for opening the portion or wall of the container (C);
   a second end portion provided at the outlet portion; and
   at least one first inlet conduit arranged within the fluid processing body, the at least one first inlet conduit being in fluid communication with the first end portion and with an inlet port of the fluid processing device,
   wherein the at least one inlet member and the at least one outlet member are separate one to another, wherein the at least one inlet member comprises the at least one first inlet conduit and the first end portion, wherein the at least one outlet member comprises at least the second end portion.

4. The fluid processing device according to claim 3, wherein the fluid processing body is an elongated body, wherein the first end portion, the second end portion and the at least one sealing member are coaxially arranged about a longitudinal axis (A), and wherein the first end portion and/or the second end portion are point shaped portions respectively.

5. Fluid processing device according to claim 3, wherein the at least one outlet member comprises at least one outlet conduit which is distinct from the at least one first inlet conduit.

6. Fluid processing device according to claim 5, wherein the at least one outlet conduit:
   is a grooved channel provided on the outer surface of the fluid processing body; and
   is in fluid communication with the second end portion.

7. The fluid processing device according to claim 3, wherein the fluid processing body comprises, between the first end portion and the second end portion, an enlarged portion having a cross-sectional area which is larger than any cross-sectional areas of the portion of the fluid processing body comprised between the first end portion and the enlarged portion, wherein the enlarged portion is configured for adhering against a wall of the container (C) at a portion of the container (C) opened by the first end portion, and wherein the at least one sealing member comprises the enlarged portion.

8. Fluid processing device according to claim 7, wherein the fluid processing body is a vertically oriented elongated body, wherein the enlarged portion is provided between the first end portion and the second end portion, and wherein the vertically oriented elongated body comprises:
   at least one outlet conduit which is a grooved channel, the at least one grooved channel being provided on an outer surface of the vertically oriented elongated body in the portion comprised between the first end portion and the enlarged portion;
   a beverage guiding element for guiding the beverage to the second end portion, the beverage guiding element being provided between the enlarged portion and the second end portion.

9. Fluid processing device according to claim 8, wherein the at least one grooved channel has a variable open cross section, which increases or decreases from the first end portion to the enlarged portion.

10. The fluid processing device according to claim 8, wherein the beverage guiding element has a tapered cross-sectional area which decreases from the enlarged portion to the second end portion.

11. Fluid processing device according to claim 1, wherein it further comprises at least one air or gas inlet bore which is in fluid communication with the at least one inlet member.

12. Fluid processing device according to claim 1, wherein it comprises a second fluid processing body connected to the fluid processing body, the second fluid processing body being internally provided with a second inlet conduit and comprising a coupling portion for removably coupling the fluid processing device to the beverage preparation machine.

13. The fluid processing device according to claim 1, wherein it comprises a second fluid processing body connected to the fluid processing body, the second fluid processing body being internally provided with a second inlet conduit, wherein the second inlet conduit has a decreasing cross-sectional area towards the at least one first inlet conduit, wherein the second inlet conduit is provided with at least a first conduit portion, having a first predefined cross-sectional area, and with a second conduit portion, having a second predefined cross-sectional area which is smaller than the first predefined cross-sectional area, wherein the second conduit portion is placed downstream of the first conduit portion and is in fluid communication with the at least one first inlet conduit.

14. The fluid processing device according to claim 1, wherein at least one through hole is interposed between at least one first inlet conduit and a second inlet conduit, the at least one through hole having an average cross-sectional area which is smaller than both the average cross-sectional area of the at least one first inlet conduit and the average cross-sectional area of the second inlet conduit.

15. The fluid processing device according to claim 4, wherein the elongated body, and wherein the longitudinal axis (A) is a vertical axis (A).

16. The fluid processing device according to claim 10, wherein the beverage guiding element has a cone-shape, and wherein the beverage guiding element has a truncated cone-shape.

* * * * *